US012699947B2

(12) United States Patent
 Arora et al.

(10) Patent No.: US 12,699,947 B2
(45) Date of Patent: Aug. 4, 2026

(54) SYSTEM AND METHOD FOR MANAGING A YARD

(71) Applicant: ISEE, Cambridge, MA (US)

(72) Inventors: Ripudaman Singh Arora, Medford, MA (US); Robert Daniel Leary, Tyngsborough, MA (US); Ning Wang, East Boston, MA (US); Le Yu, Cambridge, MA (US)

(73) Assignee: isee, Cambridge, MA (US)

( * ) Notice: Subject to any disclaimer, the term of this patent is extended or adjusted under 35 U.S.C. 154(b) by 156 days.

(21) Appl. No.: 18/646,471

(22) Filed: Apr. 25, 2024

(65) Prior Publication Data

US 2024/0362572 A1    Oct. 31, 2024

Related U.S. Application Data

(60) Provisional application No. 63/462,158, filed on Apr. 26, 2023.

(51) Int. Cl.
| | |
|---|---|
| *G06Q 10/08* | (2024.01) |
| *G05D 1/246* | (2024.01) |
| *G05D 1/656* | (2024.01) |
| *G06T 7/70* | (2017.01) |
| *G05D 111/10* | (2024.01) |

(52) U.S. Cl.
CPC .......... *G06Q 10/08* (2013.01); *G05D 1/2464* (2024.01); *G05D 1/656* (2024.01); *G06T 7/70* (2017.01); *G05D 2111/10* (2024.01); *G06T 2207/30244* (2013.01); *G06T 2207/30252* (2013.01)

(58) Field of Classification Search
CPC .. G06Q 10/08; G06Q 10/0631; G05D 1/2464; G05D 1/656; G05D 2111/10; G05D 2105/28; G05D 2107/70; G05D 2109/10; G05D 1/225; G05D 1/246; G05D 1/667; G06T 7/70; G06T 2207/30244; G06T 2207/30252; G01C 21/005; G01C 21/206; G01C 21/383
See application file for complete search history.

(56) References Cited

U.S. PATENT DOCUMENTS

| | | | |
|---|---|---|---|
| 5,438,517 | A | 8/1995 | Sennott et al. |
| 7,119,673 | B2 | 10/2006 | Eager et al. |
| 8,195,394 | B1 | 6/2012 | Zhu et al. |

(Continued)

FOREIGN PATENT DOCUMENTS

WO       1991009375 A1     6/1991

*Primary Examiner* — Garcia Ade
(74) *Attorney, Agent, or Firm* — Lando & Anastasi, LLP

(57) ABSTRACT

A method of maintaining trailer asset data in a database of a yard is presented, the method including comparing an update time difference for one or more database entries to a predetermined data refresh threshold, wherein the update time difference for a database entry is a difference between a current time and a time the database entry was last updated; commanding an ego vehicle to move a first asset within the yard from a first location to a second location; then later causing the ego vehicle to move the first asset from the first location to the second location via a route that passes by the first associated location; and updating the first database entry with newer data obtained from at least one sensor located on the ego vehicle when the ego vehicle passes by the first associated location.

20 Claims, 12 Drawing Sheets

(56) References Cited

U.S. PATENT DOCUMENTS

| | | | |
|---|---|---|---|
| 8,364,334 B2 | 1/2013 | Au et al. | |
| 8,421,611 B1 | 4/2013 | Coshow et al. | |
| 8,978,562 B2 | 3/2015 | Nagamine et al. | |
| 9,211,889 B1 | 12/2015 | Hoetzer et al. | |
| 9,274,522 B2 | 3/2016 | Boos et al. | |
| 9,283,935 B2 | 3/2016 | Fujioka | |
| 9,317,034 B2 * | 4/2016 | Hoffman | G08G 1/096708 |
| 9,459,622 B2 | 10/2016 | Abhyanker | |
| 9,592,964 B2 | 3/2017 | Göllü | |
| 9,623,859 B2 | 4/2017 | Lavoie et al. | |
| 9,656,691 B2 | 5/2017 | Heimberger et al. | |
| 10,065,317 B2 | 9/2018 | Tan et al. | |
| 10,081,504 B2 | 9/2018 | Walford et al. | |
| 10,156,848 B1 | 12/2018 | Konrardy et al. | |
| 10,245,993 B1 | 4/2019 | Brady et al. | |
| 10,259,477 B2 | 4/2019 | LeFebvre et al. | |
| 10,300,601 B2 | 5/2019 | Tan et al. | |
| 10,330,480 B1 * | 6/2019 | Krishnaswamy | G05D 1/0274 |
| 11,269,359 B2 * | 3/2022 | Wieschemann | G05D 1/0212 |
| 11,300,969 B2 | 4/2022 | Balogh et al. | |
| 11,441,916 B1 * | 9/2022 | Konrardy | G01C 21/343 |

| | | | |
|---|---|---|---|
| 2004/0182619 A1 | 9/2004 | McGregor et al. | |
| 2004/0267411 A1 | 12/2004 | Mayer et al. | |
| 2006/0145853 A1 | 7/2006 | Richards et al. | |
| 2006/0158752 A1 | 7/2006 | Perkes | |
| 2006/0181391 A1 | 8/2006 | McNeill et al. | |
| 2010/0289623 A1 | 11/2010 | Roesner | |
| 2013/0253753 A1 | 9/2013 | Burnette et al. | |
| 2014/0222971 A1 | 8/2014 | Cooper et al. | |
| 2015/0294166 A1 | 10/2015 | Kuehnle et al. | |
| 2016/0031482 A1 | 2/2016 | Lavoie | |
| 2017/0043967 A1 | 2/2017 | Walford et al. | |
| 2017/0323249 A1 | 11/2017 | Khasis | |
| 2018/0240064 A1 * | 8/2018 | Mulaosmanovic | G06K 7/10376 |
| 2018/0304468 A1 | 10/2018 | Holz | |
| 2018/0306587 A1 | 10/2018 | Holz | |
| 2019/0026690 A1 * | 1/2019 | Wappler | G06Q 50/04 |
| 2019/0077600 A1 | 3/2019 | Watts et al. | |
| 2019/0084549 A1 | 3/2019 | Dagan | |
| 2020/0168090 A1 | 5/2020 | Ayoub | |
| 2023/0115501 A1 | 4/2023 | Mu et al. | |
| 2024/0246529 A1 | 7/2024 | Wang et al. | |
| 2025/0118082 A1 * | 4/2025 | Prasad | H04N 23/695 |

* cited by examiner

Determine Asset ID    802

Determine Ego Vehicle Heading    804

Range Finder Scan    806

808    Does Data Fit Bounded Region?    NO →    812    Does Data Fit a Different Region?    NO

YES    YES

810    Associate Asset with Bounded Region

Associate Asset with Different Region    814

Update Virtual Map    816

800

852 — Conflicting Updates Available?

NO → Update with available data — 858

YES

854 — Is One More Recent?

YES → Update with Most Recent Data — 860

NO

856 — Is One More Confident?

YES → Update with High Confidence Data — 862

NO → Update with Default Rule — 864

850

1006

1008

1016  X

1010

1018

1014

1012

Asset ID
1004a

Asset Location/
Destination
1004b

Exceptions
1004c

Control Interface
1002

1004

1000

SYSTEM AND METHOD FOR MANAGING A YARD

CROSS REFERENCE TO RELATED APPLICATION

This application claims priority, under 35 U.S.C. § 119 (e), to U.S. Provisional Application 63/462,158, titled SYSTEM AND METHOD FOR MANAGING A YARD and filed on Apr. 26, 2023, which is hereby incorporated by reference in its entirety for all purposes. This application is also related to U.S. patent application Ser. No. 18/646,519, titled SYSTEM AND METHOD FOR MANAGING A YARD, filed on Apr. 25, 2024, which is hereby incorporated by reference in its entirety for all purposes.

BACKGROUND

In logistics, goods are often transported in trailers by tractors, such as semi-trucks and other kinds of tractor-trailer. Trailers are often parked in yards, which define parking areas that are often located nearby warehouses or other logistics facilities, such as structures having loading docks. Trailers, moved by tractors, may arrive at and leave from yards throughout the day and night, making it difficult to manage yards.

SUMMARY

According to at least one aspect of the present disclosure, a method of maintaining trailer asset data in a database of a yard is presented, the method comprising: comparing an update time difference for one or more database entries to a predetermined data refresh threshold, wherein the update time difference for a database entry is a difference between a current time and a time the database entry was last updated; commanding an ego vehicle to move a first asset within the yard from a first location to a second location; wherein when the update time difference for a first database entry exceeds the predetermined data refresh threshold, and a first associated location associated with the first database entry is outside of a shortest path between the first location and the second location, causing the ego vehicle to move the first asset from the first location to the second location via a route that passes by the first associated location; and updating the first database entry with newer data obtained from at least one sensor located on the ego vehicle when the ego vehicle passes by the first associated location.

In some examples, the at least one sensor includes a video camera. In some examples, each time an ego vehicle passes by an asset location where an asset may be located, the at least one sensor scans a bounded region at the asset location, a controller in communication with the at least one sensor determines, based on data provided by the at least one sensor, whether the asset is located within the bounded region, if the asset is determined to be at least partially within the bounded region, the controller determines an identity of the asset relative to the bounded region and compares the identity to a stored identity for a database entry associated with the bounded region. In some examples, if the identity matches the stored identity, the data stored in the database associated with the bounded region is not altered, and a time of a last data update for this database entry is reset to the current time. In some examples, if the identity does not match the stored identity, the identity is recorded in the database entry associated with the bounded region, and a time of a last data update for the database entry associated with the bounded region is reset to the current time. In some examples, a first image is provided to an asset ID module if the asset located within an unprocessed version the first image occupies at least 50% of the image. In some examples, the identity of the asset is determined by locating an asset identifier within the first image of the asset captured by the ego vehicle, extracting the asset identifier from the first image by the asset ID module, and providing the asset identifier to a rectification module to determine if the asset identifier matches a known asset identifier. In some examples, the rectification module determines a probability that the asset identifier is erroneous. In some examples, if the probability that the asset identifier is erroneous is above a predetermined threshold probability, an ego vehicle is routed to pass by the location of the bounded region to scan any asset present within the bounded region. In some examples, if the probability that the asset identifier is erroneous is above a predetermined threshold probability, a second image of the asset is obtained, a second asset identifier is located within the second image of the asset, and the asset identifier is extracted from the second image by the asset ID module. In some examples, the asset identifier extracted from the second image is provided to the rectification module to determine if the asset identifier matches a known asset identifier. In some examples, the rectification module uses state data associated with the asset to assist in determining the identity of the asset. In some examples, a probability that data in a second database entry is correct is determined to be below a predetermined threshold probability, the ego vehicle is routed to pass by a second associated location associated with the second database entry to re-scan the identity. In some examples, prior to being routed past the second associated location, the ego vehicle was idle. In some examples, the database maintains state data associated with assets located within the yard, wherein state data comprises data describing physical features of the assets. In some examples, the database maintains state data associated with assets located within the yard, wherein state data comprises data describing poses of the assets within the yard. In some examples, the database maintains state data associated with assets located within the yard, wherein state data comprises data describing one or more brands of assets within the yard. In some examples, if a subset of data in the database entry does not match the newer data obtained from the at least one sensor, a probability measure that data in the database is correct is reduced. In some examples, a history of database entries is maintained for at least a predetermined number of passes of an ego vehicle past the first associated location, to allow current data to be compared with the history of database entries.

According to at least one aspect of the present invention, a method of maintaining trailer asset data in a database of a yard is presented, the method comprising: determining one or more bounded regions in a yard; associating a first bounded region with a first database entry; determining a time difference between a current time and a first time associated with the first database entry, wherein the first time corresponds to when data in the first database entry was entered into the database; comparing the time difference to a predetermined time difference threshold; wherein if the time difference is larger than the predetermined time differ-ence threshold, routing an ego vehicle to pass by the first bounded region to scan any assets present within the first bounded region, with sensors located on the ego vehicle, to generate new scanned data; overwriting data in the first database entry with the new scanned data; and updating the first time associated with the first database entry to a new time corresponding to when the data in the first database entry was overwritten with the new scanned data.

According to at least one aspect of the present disclosure a method for identifying assets in a yard is presented, the method comprising receiving an image of an asset; responsive to receiving the image of the asset, determining a portion of the image containing an identifier; responsive to determining the portion of the image, segmenting the identifier contained within the portion of the image into one or more symbols; responsive to segmenting the identifier, determining a value of each symbol of the one or more symbols; responsive to determining the value of each symbol, recomposing the identifier based on the one or more symbols; responsive to recomposing the identifier, performing a comparison of the identifier to one or more known identifiers; and responsive to performing the comparison, determining a confidence that the identifier is correct based on the comparison.

In some examples, the method further comprises receiving location data associated with the asset; based on the location data, determining a location of the asset; and associating the identifier with the location. In some examples, segmenting the identifier into one or more symbols includes dividing the identifier into a plurality of segments, each segment corresponding to a respective symbol. In some examples, the method further comprises, responsive to receiving the image, evaluating at least one criterion of the image to determine whether the image requires processing. In some examples, the method further comprises based on the at least one criterion, determining that the image requires processing; and responsive to determining that the image requires processing, adjusting at least one characteristic of the image. In some examples, the method further comprises evaluating the image to determine whether the image is sufficient. In some examples determining whether the image is sufficient includes evaluating readability of at least one symbol within the image. In some examples, the method further comprises, responsive to recomposing the identifier, determining a probability that the identifier is correct. In some examples, determining a probability that the identifier is correct further includes comparing the identifier to a database of known identifiers. In some examples, the method further comprises responsive to determining the probability, determining whether the probability is below a threshold level; and responsive to determining that the probability is below a threshold level, flagging the identifier for further review.

According to at least one aspect of the present disclosure, a method of identifying assets is provided, the method comprising: determining environmental conditions corresponding to an environment containing an asset; determining whether the environmental conditions are within a threshold level; responsive to determining that the environmental conditions are not within the threshold level, adjusting at least one environmental condition of the environmental conditions; responsive to determining whether the environmental conditions are within a threshold level, capturing an image of the asset; responsive to capturing an image of the asset, identifying an identifier of the asset in the image; and associating the identifier with a location.

In some examples, identifying an identifier of the asset further comprises using a machine learning algorithm trained to recognize identifiers to determine which symbols on the asset are part of the identifier. In some examples, the method further comprises responsive to identifying an identifier, segmenting the identifier into one or more symbols; responsive to segmenting the identifier into one or more symbols, determining a value of each symbol of the one or more symbols; and responsive to determining the value of each symbol of the one or more symbols, recomposing the identifier based on the value of each symbol. In some examples, the method further comprises receiving location data corresponding to a location of the asset; responsive to receiving the location data, associating the identifier with the location. In some examples, the environmental conditions include at least one condition within a set including lighting conditions and weather conditions. In some examples, the method further comprises determining whether to process the image; and processing the image responsive to determining to process the image and prior to identifying the identifier. In some examples, determining whether to process the image includes evaluating at least one criterion for the image to determine if the image meets the criterion. In some examples, the method further comprises prior to identifying the identifier, training a machine learning algorithm to recognize identifiers using a training associated with known identifiers; and identifying the identifier using the machine learning algorithm.

According to at least one aspect of the present disclosure, an apparatus for identifying assets in a yard is presented, the apparatus comprising: a vehicle; at least one camera mounted on the vehicle and configured to capture images; at least one localization module mounted on the vehicle and configured to provide a location of the vehicle; and a controller configured to: control the at least one camera to capture an image; determine an identifier in the image; receive location data from the at least one localization module; determine a location of the ego vehicle based on the location data; and associate the identifier with the location.

In some examples, the controller determines the identifier in the image by: determining at least one group of symbols; determining a value of each symbol of the at least one group of symbols; responsive to determining the value of each symbol, determining an identifier value of the identifier based on the value of each symbol; and determine the identifier based on the identifier value. In some examples, the controller is further configured to: receive an image of an asset; responsive to receiving the image of the asset, determining an identifier associated with the asset; responsive to determining the identifier, segmenting the identifier into one or more symbols; responsive to segmenting the identifier, determining a value of each symbol of the one or more symbols; and responsive to determining the value of each symbol, recomposing the identifier based on the one or more symbols. In some examples, determining the value of each symbol includes segmenting the at least one group of symbols into a plurality of segments, each segment of the plurality of segments corresponding to a respective symbol. In some examples, the controller is further configured to determine whether the image is adequate based on one or more criteria. In some examples, the controller is further configured to, responsive to determining that the image is inadequate, discard the image. In some examples, the controller is further configured to determine whether the image requires further processing based on one or more criteria, and, responsive to determining that the image requires further processing, adjust at least one characteristic of the image. In some examples, the controller is further configured to determine a probability that the identifier is correct. In some examples, the controller is further configured to, responsive to determining the probability, compare the probability to a probability threshold, and, responsive to the probability being below the probability threshold, flag the identifier for further review.

According to at least one aspect of the present disclosure, a system for determining the location of an asset in a yard is disclosed, the system comprising: a vehicle configured to navigate a yard; a virtual map configured to reflect a state of the yard; and a controller configured to: receive an image of the asset; determine an identifier associated with the asset in the image; associate the identifier with a location of the asset; and update the virtual map based on the location and the identifier.

In some examples, the vehicle is an autonomous vehicle. In some examples the virtual map includes a plurality of regions, the plurality of regions including one or more bounded regions corresponding to spaces for assets. In some examples, the vehicle further comprises: one or more localization modules configured to receive and provide data corresponding to a location of the vehicle; and one or more range finding systems configured to detect assets. In some examples, the controller is further configured to: determine a heading of the vehicle based on the location data; and determine the location of the asset based on the heading and location data; determine one or more boundaries of the asset; and determine, based on the one or more boundaries of the asset; one or more regions of the plurality of regions the asset occupies. In some examples, the vehicle further comprises one or more cameras. In some examples, the controller is further configured to evaluate the image to determine if the image is useable. In some examples, the controller is further configured to evaluate the environmental conditions of the asset based on the image and to adjust at least one environmental condition of the asset based on determining that the environmental conditions of the asset are inadequate. In some examples, determining that the environmental condition of the asset is inadequate includes determining that the image is too dark, and adjusting at least one environmental condition of the asset includes providing a light to illuminate the asset. In some examples, the controller is further configured to: determine if the image should be processed; and responsive to determining that the image should be processed, adjusting at least one characteristic of the image. In some examples, determining the identifier of the asset includes: segmenting the asset into a group of symbols; determining a value of each symbol of the group of symbols; and recomposing the identifier based on the value of each symbol of the group of symbols. In some examples, updating the virtual map includes updating at least one location on the virtual map to reflect a current location of the asset. In some examples, updating the virtual map includes updating at least one database containing at least one copy of the live map. In some examples, updating the virtual map includes updating a location of the vehicle and a heading of the vehicle.

According to at least one aspect of the present disclosure, a system for identifying and locating assets in a yard is provided, the system comprising: at least one camera configured to capture an image; at least one localization module configured to receive location data; at least one virtual map; at least one range finder module configured to obtain object data; and at least one vehicle equipped with a controller, the controller being configured to: determine an identifier of an asset based on the image; associate the identifier with one or more locations on the at least one virtual map based at least in part on the object data and the location data; and update the at least one virtual map based on the identifier and the one or more locations.

According to at least one aspect of the present disclosure, a method for determining the contents of a yard is provided, the method comprising: determine a current location of a vehicle; determine a target location of the vehicle; determine a path between the current location and the target location; route the vehicle along the path; determine an identifier of at least one asset between the current location and the target location along the path; and update a virtual map based on the identifier of the at least one asset.

In some examples, the path is a best-fit path determined based on one or more rules. In some examples, determining the identifier of the at least one asset includes: capturing an image of the at least one asset; identifying a group of symbols in the image that are associated with the at least one asset; determining a value of each symbol of the group of symbols in the image; and determining the identifier based on the value of each symbol of the group of symbols. In some examples, updating the virtual map based on the identifier of the at least one asset includes: determining at least one boundary of the at least one asset; determining one or more locations occupied by the at least one asset based on the at least one boundary; and associating the identifier with one or more locations on the virtual map corresponding to the one or more locations occupied by the at least one asset. In some examples, the method further comprises determining a first location of an asset; determining a second location of the asset; determining a transport path between the first location of the asset and the second location of the asset; and using the vehicle to move the asset from the first location to the second location. In some examples, the method further comprises determining one or more identifier of one or more assets along the transport path.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Figure 1:
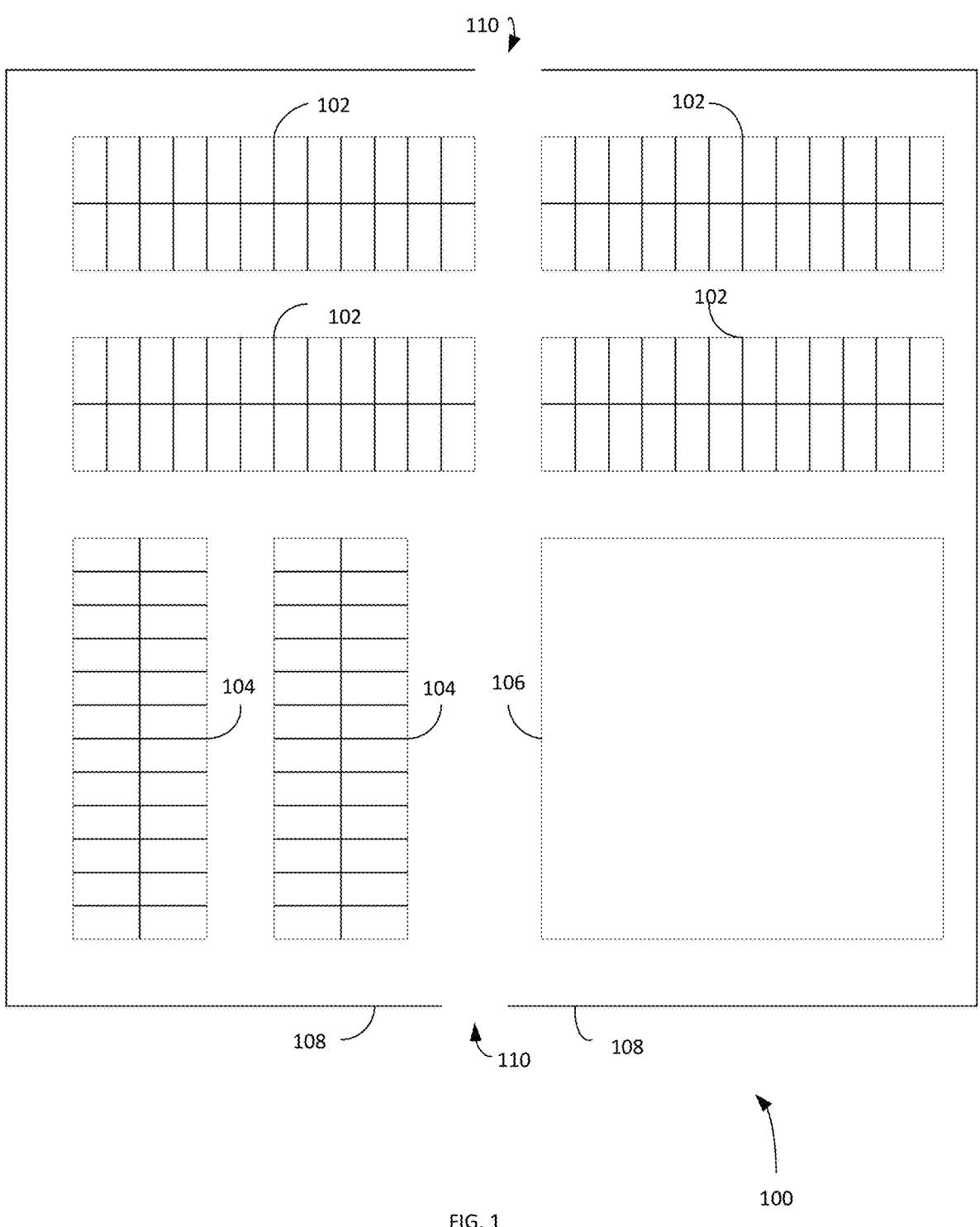
FIG. 1 illustrates a yard according to an example.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular also may embrace embodiments including a plurality, and any references in plural to any embodiment, component, element or act herein also may embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items.

References to "or" may be construed as inclusive so that any terms described using "or" may indicate any of a single, more than one, and all of the described terms. In addition, in the event of inconsistent usages of terms between this document and documents incorporated herein by reference, the term usage in the incorporated features is supplementary to that of this document; for irreconcilable differences, the term usage in this document controls.

Trailers are moved around within, as well as in and out of, yards throughout the day and night. Most trailers contain a unique identifier, such as a unique string, a numeric sequence, an alpha-numeric sequence, QR codes, or other types of symbols, to identify the trailer and its contents. The individual elements of an identifier may be referred to as a marker (or markers) herein. Yards contain parking areas ("parking spots") for trailers. Yards may contain any number of parking spots, and also may include other zones designated for trailer use, as well as loading docks, entrances and exits, and so forth.

Aspects and elements of the present disclosure relate to accurately identifying assets, for example trailers, associating the assets with specific spots in the yard, and managing assets within the yard. For example, a vehicle equipped to identify assets and parking spaces (the "ego vehicle") may capture data including the unique identifier associated with a asset located within the yard. The ego vehicle also may capture asset orientation and geolocation data, as well as the ego vehicle's own geolocation and orientation data. Some or all of the data may be used to associate a given asset within the yard with a given spot where the asset is located. Some or all of the data also may be used to plan routes for vehicles and assets within the yard, identify obstacles, and perform other yard management functions.

FIG. 1 illustrates a yard 100 according to an example. The yard 100 includes a first plurality of parking spaces, each indicated at 102, and a second plurality of parking spaces, each indicated at 104, a building 106, a boundary 108, and access points, each indicated at 110.

The first plurality of parking spaces 102 includes parking spaces that are each large enough to accommodate an asset, for example a trailer. Similarly, the second plurality of parking spaces 104 includes parking spaces that are each large enough to accommodate an asset, but the parking spaces of the second plurality of parking spaces 104 are orthogonal to the parking spaces of the first plurality of parking spaces 102. In various examples, the parking spaces of the pluralities of parking spaces 102, 104 may be at any angle to each other, and may be arranged in other topologies, such as extending in a circular manner from a central point, and so forth.

The building 106 may be any type of building. In some examples, the building 106 may be a warehouse. In various examples, the building 106 may have one or more loading docks or other features designed for use with an asset, such as a trailer.

The space between the parking spaces 102, 104 may be roads or paths that accommodate trailers and tractors (tractors being any device designed to move a trailer, including semitrucks, trucks, and so forth).

The access points 110 may be areas where the outside world can enter and/or exit the yard 100. For example, the access points 110 may be entrances that permit access to public roads. The access points 110 may be secured (for example, gated) or generally open.

The boundary 108 of the yard 100 may be a property line, a gate, a wall, or anything else that demarcates the boundaries of the yard 100.

Figure 2:
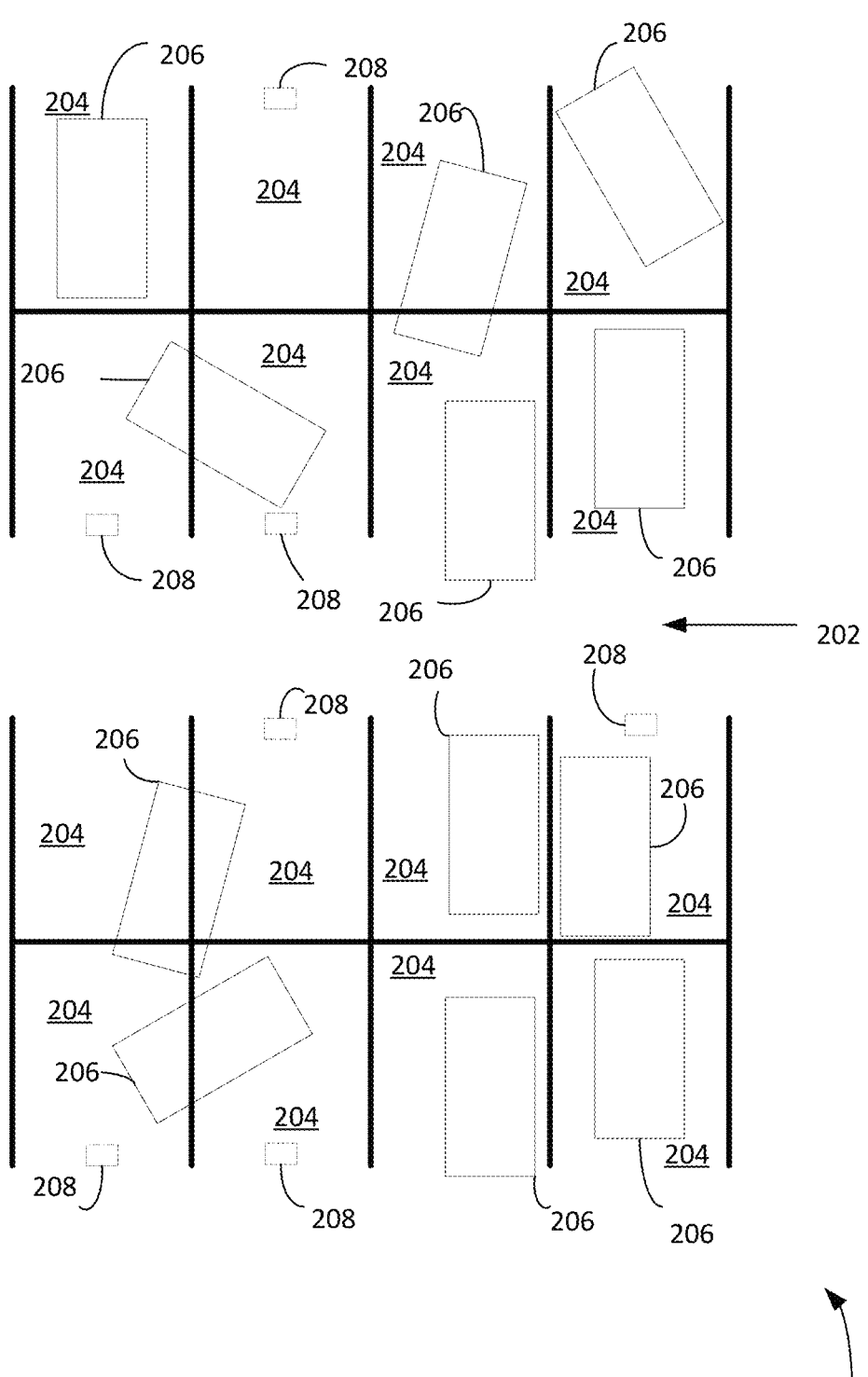
FIG. 2 illustrates a plurality of parking spaces according to an example.

FIG. 2 illustrates a closeup of a plurality of parking spaces 200. An aisle 202 separates some of the parking spaces 204 from one another. Some parking spaces 204 contain assets 206 (such as trailers in a yard, or containers in container terminals, and so forth), and some parking spaces 204 contain optional parking space identifiers 208, which may be numeric labels, alphanumeric labels, QR codes, other symbols, and so forth, which may uniquely identify one or more parking spaces 204. Parking space identifiers 208 are not required by the systems and methods described herein. That is, as will be discussed, even without a parking space identifier 208 for a parking space 204, the systems and methods described herein can still associate a trailer with a specific location in a yard.

Assets 206 may be parked in the parking spaces 204 in a variety of manners. The assets 206 may be parked at any orientation relative to any parking space 204. The assets 206 may be parked in more than one spot, the assets 206 may extend into the aisle 202, and the assets 206 may cover up one or more of the parking space identifiers 208. In some cases, it is ideal to park the assets 206 such that the assets 206 are in line with the parking space 204 (e.g., the edges of the asset 206 are more-or-less parallel to the edges of the parking space 204) and the assets 206 do not overlap or occupy multiple parking spaces 204 or overlap any parking space identifiers 208, and do not extend into the aisle 202. However, assets 206 may not always be parked in an ideal manner. In some examples, assets 206 may even be parked in the aisle 202, stacked atop other assets 206, double-parked (that is, parked in behind other assets), and so forth. Assets 206 may also be moved in a pseudorandom manner (that is, a tractor or other towing vehicle may move one or more of the assets 206), based on which assets 206 are scheduled for use at a given time (which may depend on the logistical needs of third parties, for example).

Figure 3:
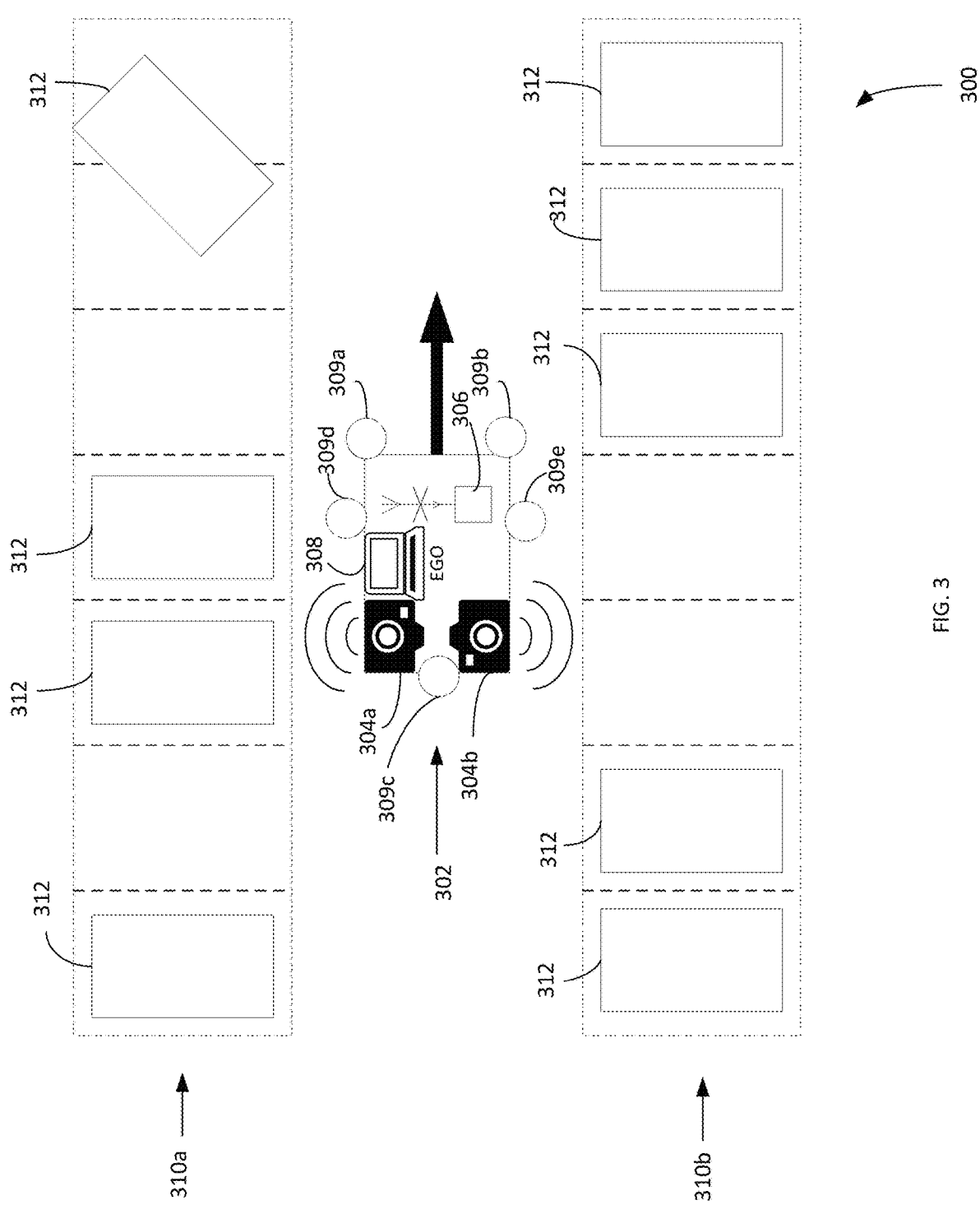
FIG. 3 illustrates a plurality of parking space according to an example.

FIG. 3 illustrates a top-down diagram 300 of an ego vehicle traversing a line of parking spaces to acquire asset identifiers (such as trailer identifiers) and other data.

The diagram 300 includes a first plurality of parking spaces 310a opposite a second plurality of parking spaces 310b, a plurality of assets, each indicated at 312 (such as trailers), and an ego vehicle generally indicated at 302. The ego vehicle 302 includes a first camera 304a, an optional second camera 304b ("second camera 304b"), a localization module 306, and at least one controller 308 ("controller 308") (which may include one or more processors as well as memory and/or storage for data). The ego vehicle 302 also includes one or more range finding systems 309a-c.

As illustrated, the ego vehicle 302 is traversing a space, such as an aisle (e.g., aisle 202) between the parking spaces 310a, 310b. The ego vehicle 302 may be an autonomous and/or manned vehicle configured to traverse a yard (e.g., yard 100) and record the identifiers of the parking spaces of the plurality of parking spaces 310a, 310b and/or the assets 312. In some examples, the ego vehicle 302 may also be equipped with other yard equipment, such as hitches, gladhand couplers, towing equipment, plows, or other equipment that can be equipped to a truck or truck-like vehicle. That is, in some examples, the ego vehicle 302 may be equipped to perform the functions of other yard vehicles such as tractors, trucks, forklifts, and so forth.

The ego vehicle 302 may capture asset state data (and ego vehicle state data). Asset state data may include the asset's pose (the asset's orientation and position), height (above the ground, generally measured as the distance from the ground to the bottom of the trailer), kingpin height, landing gear height, wheelbase, type of gladhands (including how the glad hands are oriented with respect to the front of the trailer), front overhang, rear overhang (where overhang is the extent to which the front or rear of the asset protrudes beyond the location of the foremost or rearmost located axles of the asset), weight, contents of the asset, color of the asset, the location of the tandem of the asset, other physical characteristics of the asset (such as physical features, color, non-identifier markings, scuffs, brand information, damage, number of axles, and so forth), landing gear position and state (deployed or retracted), and so forth. The asset state data may be stored for later use. In general, the cameras 304a, 304b, localization modules 306, range finding system 309a-e, and other sensors or data inputs on the ego vehicle 302 may collect asset state data. Ego vehicle state data may also include any type of information recited with respect to asset state data, and may be determined in the same or similar ways, for example, by using the sensors on the ego vehicle.

As the ego vehicle 302 traverses the space between the parking spaces 310a, 310b, the cameras 304a, 304b may record images of the parking spaces 310a, 310b and/or assets 312. For example, the cameras 304a, 304b may take a picture that captures an identifier of an asset and/or an identifier of the parking space of the asset. The cameras 304a, 304b may capture some or all of the asset state data associated with given assets (for example, trailers in the yard).

The localization module 306 of the ego vehicle 302 may include one or more components such as a global positioning system (GPS) or similar device capable of providing an exact or approximate location of the ego vehicle 302. The location information provided by the localization module 306 may be combined with the images captured by the cameras 304a, 304b and/or any information extracted from the images to determine a location of a given asset 312. In some examples, multiple localization modules, including localization module 306, may be used by a single ego vehicle 302 (for example, two, four, seven localization modules per ego vehicle 302). In such examples, the multiple localization modules 306 may provide the ego vehicle 302 with two or more locations that can be used to derive the orientation (or direction and/or facing) of the ego vehicle 302 in absolute and/or relative terms. For example, the ego vehicle 302 may be equipped with two localization modules 306 including a first localization module that could be placed at or near the front of the ego vehicle 302 and a second localization module that could be placed at or near the rear of the ego vehicle 302. In some examples, the first and second localization modules can be placed along a same axis of the ego vehicle, for example the central axis of the ego vehicle 302 between the front and back. Using the locations returned by the first and second localization modules, the pose (orientation, location, and so forth) of the ego vehicle 302 can be determined. For example, the controller 308 could calculate a vector or line from the second localization module to the first localization module which would represent the direction the ego vehicle is facing with respect to the perspective of the GPS or other localization system. In some examples, the location on the ego vehicle 302 of the localization modules 306 may be known or predetermined (e.g., during installation of the modules).

Figure 4:
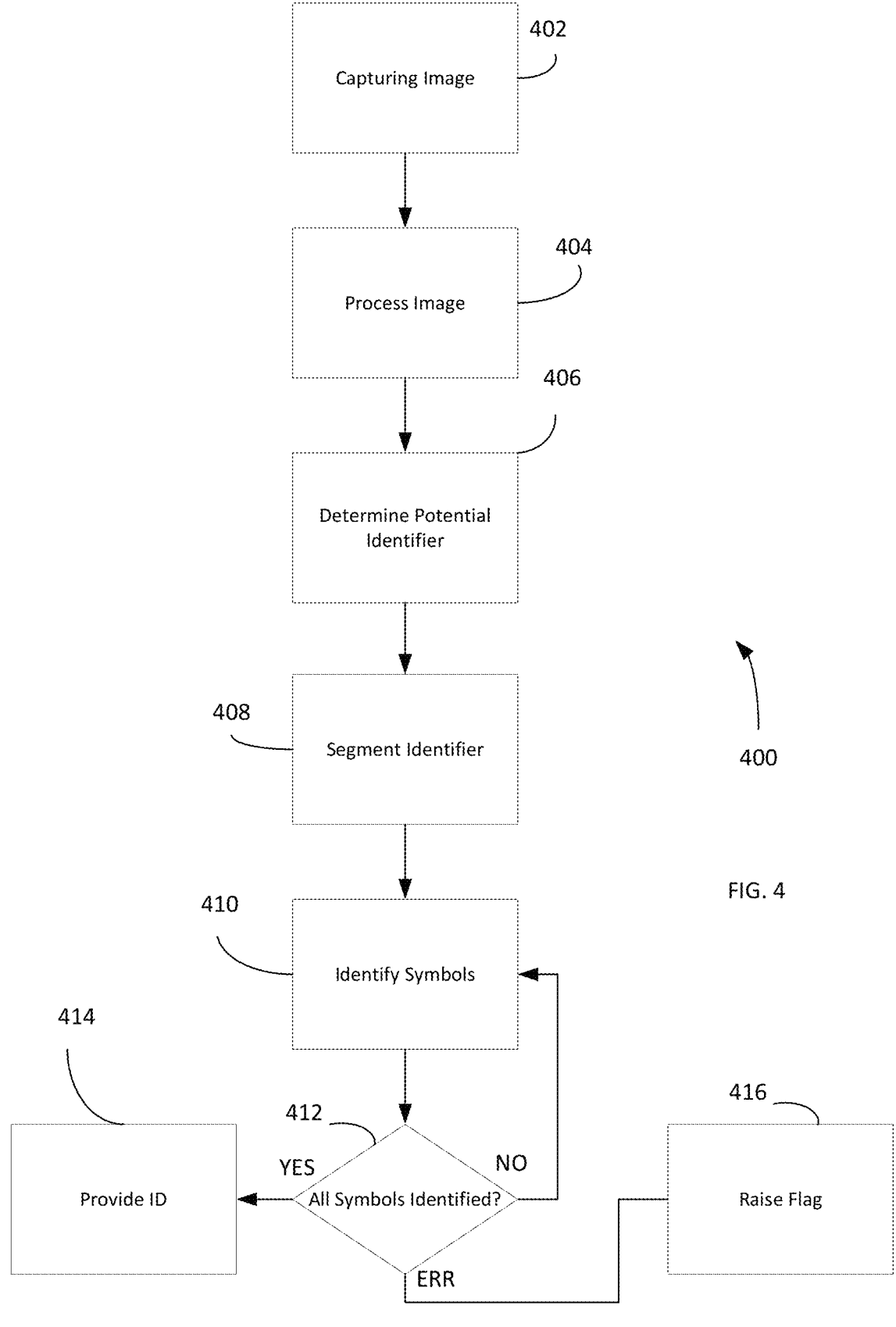
FIG. 4 illustrates a process for capturing an image according to an example.

The controller 308 may be a computer system or circuit capable of performing actions and processes described with respect to FIGS. 3 and 4 and elsewhere herein. The controller 308 may receive the image data from the cameras 304a, 304b and the location data from the localization module 306 and use the data to determine the ID of an asset 312, the asset's corresponding parking space among the plurality of parking spaces 310a, 310b, and the asset's location.

The ego vehicle 302 also may include one or more range finding systems 309a-e (such as LIDAR or RADAR systems). The range finding systems 309a-e may detect obstacles around the ego vehicle as well as assets 312 and other things in the proximity of the ego vehicle 302. The range finding systems 309a-e also may capture asset state data. In some examples, the ego vehicle 302 may have more than one range finding system, for example, two, four, seven such systems, and so forth.

In some examples, one or more of the range finding systems 309a-e will be positioned low on the ego vehicle 302. For example, the left side range finding system 309d and the right side range finding system 309e may be positioned low enough that each system 309d-e would be positioned below the bottom of a stationary trailer, such that the range finding system 309d-c would be able to pass between the bottom of the trailer and the ground. In some examples, the forward range finders 309a-b may be positioned on the grill of the ego vehicle 302. The asset state data (and the ego vehicle state data) may be determined with respect to a frame of reference. In some examples, the frame of reference may be the yard 100 or a point on the virtual map (such as the point of origin, coordinate (0,0), of the virtual map) of the yard 100, or a point on a global coordinate system (e.g., GPS coordinates). Asset state data may include the location and relative positioning of objects in the yard 100, including assets such as trailers, or other objects such as vehicles, equipment, and so forth. For example, using LIDAR based range finding systems 309a-e, the controller 308 may analyze the point cloud returned by the LIDAR system to determine the location of edges of objects within the LIDAR sensor's range relative to the ego vehicle 302. By comparing the point cloud data to the location data from the localization module 306 (possibly including the heading information for the ego vehicle 302 derived therefrom), the controller 308 can determine the physical position of a asset relative to the yard and/or parking space in which the asset is parked. Put another way, the range finding systems 309*a-e* may detect at least the pose of assets relative to the ego vehicle 302. The controller 308, in communication with the localization module 306, can transform the pose of the asset relative to the ego vehicle 302 into a pose of the asset relative to the yard. Such a transformation can represent the geographic position and orientation of the asset in the yard in the global coordinate system or any other frame of reference.

The ego vehicle 302 may traverse the yard at time intervals of uniform or non-uniform length, and may thus periodically update the asset state data, including the location and/or pose of one or more assets 312, at least by updating the asset identifiers of assets 312 associated with given parking spaces within the yard. Methods and systems by which the ego vehicle 302 identifies parking spaces and assets and associates assets with parking spaces will be described in greater detail below.

FIG. 4 illustrates a process 400 for determining an identifier associated with an asset, such as an asset or parking space. The process 400 illustrates one example of how the controller 308, or another computational device associated with the ego vehicle 302 or external to the ego vehicle, can identify a sequence of symbols on an asset and associate that sequence of symbols with the asset. Determining a sequence of symbols, in turn, allows for unique identifiers associated with an asset or parking space to be determined and recorded, so that an end user or system knows where a given asset is within a yard.

Identifiers are collections of symbols that identify an asset. Identifiers may be sequences of one or more symbols. Symbols include alphanumeric text and/or other types of symbols (e.g., QR codes, logos, and so forth). For example, the string "ABC123" is a sequence of alphanumeric text, and is composed of the symbols "A," "B," "C," "1," "2," and "3." An identifier may be any length and may be oriented at any angle relative to the viewer and/or camera (for example, horizontal, vertical, or anywhere in between). Identifiers also may occupy multiple horizontal lines or vertical columns. While FIG. 4 discusses identifiers located on assets, such as identifiers painted or stenciled onto a trailer, the systems and methods described with respect to FIG. 4 can apply also to parking space identifiers associated with parking spaces.

At act 402, the controller controls a device, such as a camera, to capture image data, including at least one image, of an asset. The asset may be a trailer or a face of a trailer on which identifiers may be located. The controller may control multiple devices and multiple parts of a device to capture the image data. For example, in dark conditions, the controller may control a lamp or similar device to provide a bright light to illuminate the asset, and so forth. The process 400 may then continue to act 404.

At act 404 the controller processes the image data. The controller may make various adjustments to the image data. For example, the controller may take one or more unprocessed images or an unprocessed version of the one or more images, and may modify these unprocessed images in various ways. In some examples, an unprocessed image may be the raw image, as originally captured, without any adjustments applied to it. In general, the controller may adjust any quantifiable characteristic of the image data, including contrast, brightness, saturation, luminosity, sharpness, white balance, vibrance, rotational angle, size, distortion, and so forth (collectively "image characteristics"). In some examples, the controller may have different families of adjustments for use with image data captured under different conditions. For example, the controller might apply one family or set of adjustments to image data captured in low-light conditions, a different family or set of adjustments to an image data captured in rain or fog, and so forth. The process 400 may then continue to act 406.

At act 406, the controller detects potential identifiers in the image data. The controller may separate the image data into various discrete portions, and identify those portions that are more likely to contain identifiers. For example, each discrete portion of the image data may be a portion of an image that contains and immediately surrounds an identifier, and omits portions of the image that do not contain identifiers and/or symbols. Separating the image data into discrete portions may reduce computational overhead. In some examples, only discrete portions identified as likely to contain identifiers will be subject to further processing by the controller.

The controller may use a machine learning algorithm to detect potential identifiers. For example, the controller may use a machine learning algorithm trained on a database of identifiers including alphanumeric text, collections of symbols, asset identifiers and so forth. In some examples, the controller will determine where clusters of symbols that are likely related are located in the image data, and may treat the cluster of symbols as an identifier. The portion of the image used by the controller may be based on the cluster of symbols being treated as an identifier (e.g., the portion of the image used may be defined to be a region proximate to and including the identifier). Once a potential identifier is detected, the controller may use the portion of the image associated with the identifier. In general, the machine learning algorithm may recognize any identifier that a human could identify using the same image and/or image data. The process 400 may then continue to act 408.

At act 408, the controller segments the identifier into discrete symbols. The controller may segment the identifier using a machine learning algorithm trained to segment groups of symbols, or may use optical character recognition (OCR) systems to segment the symbols, or may use other metrics (such as kerning or spacing between symbols, continuity of symbols, and so forth). The process 400 may then continue to act 410.

At act 410, the controller associates a symbol with a value. For example, a symbol that looks like the letter "B" may be associated with the letter "B" or a value corresponding to the letter B. The controller may perform the association of symbol with value using optical character recognition, machine learning, similarity metrics, and so forth. In some examples, the controller may estimate a probability distribution over the value of a symbol and/or identifier that is unclear, obstructed, or otherwise difficult to determine to determine a best-fit or most likely value for a symbol. In some examples, a symbol will be assigned or associated with a value if the controller has a confidence level that the symbol and value match exceeding a confidence threshold. The confidence threshold may be a degree of confidence in the match, for example, 50% confidence of matching, 70% confidence of matching, 90% confidence of matching, or any other threshold value desired. The process 400 may then continue to act 412.

At act 412, the controller determines if each symbol of the identifier has been associated with a corresponding value. If the controller determines that one or more symbols has not been associated with a value (412 NO), the process 400 may return to act 410 to associate a new symbol with a corresponding value. If the controller determines that each symbol has been associated with a value (412 YES), the process 400 continues to act 414. In some examples, the controller may not be able to identify a symbol. If the controller is unable to identify a symbol (412 ERR), the process 400 may continue to act 416.

At act 414, the controller generates an identifier based on the symbols. The controller may generate an identifier based on the aggregation or combination of each symbol identified during acts 410 and 412 The controller may order the symbols to form the identifier, including by ordering the symbols from left to right according to where the symbols occurred in the image data and/or top to bottom (again, according to where the symbols occurred in the image data). Once the controller has ordered the symbols into a string, the controller can provide the string of ordered symbols to a user, another application, another process, and/or an external device.

At act 416, the controller flags a symbol as being unidentifiable, or being below the confidence threshold. The flag may indicate that the flagged symbol should be further reviewed. The controller may assign the symbol a "best-guess" value pending review, and the corresponding identifier containing the flagged symbol may be flagged as well. However, the controller may have high confidence in an identifier even if it has low confidence in a symbol. In such examples, the controller may identify this apparent discrepancy. The reason for the apparent discrepancy is that the controller can infer that an identifier is likely correct based on external data, such as databases of known identifiers, geometric information about the asset, the location of the asset, and so forth.

In addition to the foregoing, the controller also may generate a confidence and/or confidence interval (collectively "confidence") for the identifier, in addition to the confidence levels for the symbols. The confidence may reflect a certainty or probability that the identifier (or symbol) is correct. For example, if the identifier is based on an image that was blurry or taken in poor-visibility conditions, the confidence may be lower compared to a sharp image and/or an image taken in high-visibility conditions.

Confidence may be determined in multiple ways. In one example, the confidence in the identifier and/or symbol may be determined by the machine learning model as part of the process of identifying the identifier based on a comparison of the present image or image data to all past images and/or image data.

In another example, the controller also may use a sequence of images to determine the confidence that an identifier or symbol is correct. In some possible implementations, the ego vehicle may be equipped with a video camera configured to create a constant stream of related images at a given framerate. In some examples, to obtain higher confidence, identifiers extracted from sequential images created as part of a video can be compared to one another, with the confidence in an identifier being correct being higher if the identifiers are the same and/or similar between each image in the sequence. For example, if an image taken at one time and then a second image taken $\frac{1}{60}^{th}$ of a second later contain matching identifiers, the controller may determine a higher confidence for the identifier than if the two images did not contain matching identifiers. Likewise, the images in the sequence may be compared to one another to ensure the images are similar or within a threshold similarity (thus helping to prevent the controller from comparing an image of one identifier to an image of another identifier where there would be no match, and no match would be expected).

In another example, the identifier can be compared to a database of known identifiers corresponding to assets known to be present in the yard (or to have been present in the yard) and if the identifier matches a known identifier the confidence may be high. Likewise, if a parking space or other location of the asset is known, and an asset identifier is determined to be in the same space or location, if the asset matches the asset identifier confidence in the identifier may be high, while if there is a mismatch confidence may be lower. In some examples, any of the above methods of determining confidence can be used in tandem with one another.

Figure 5:
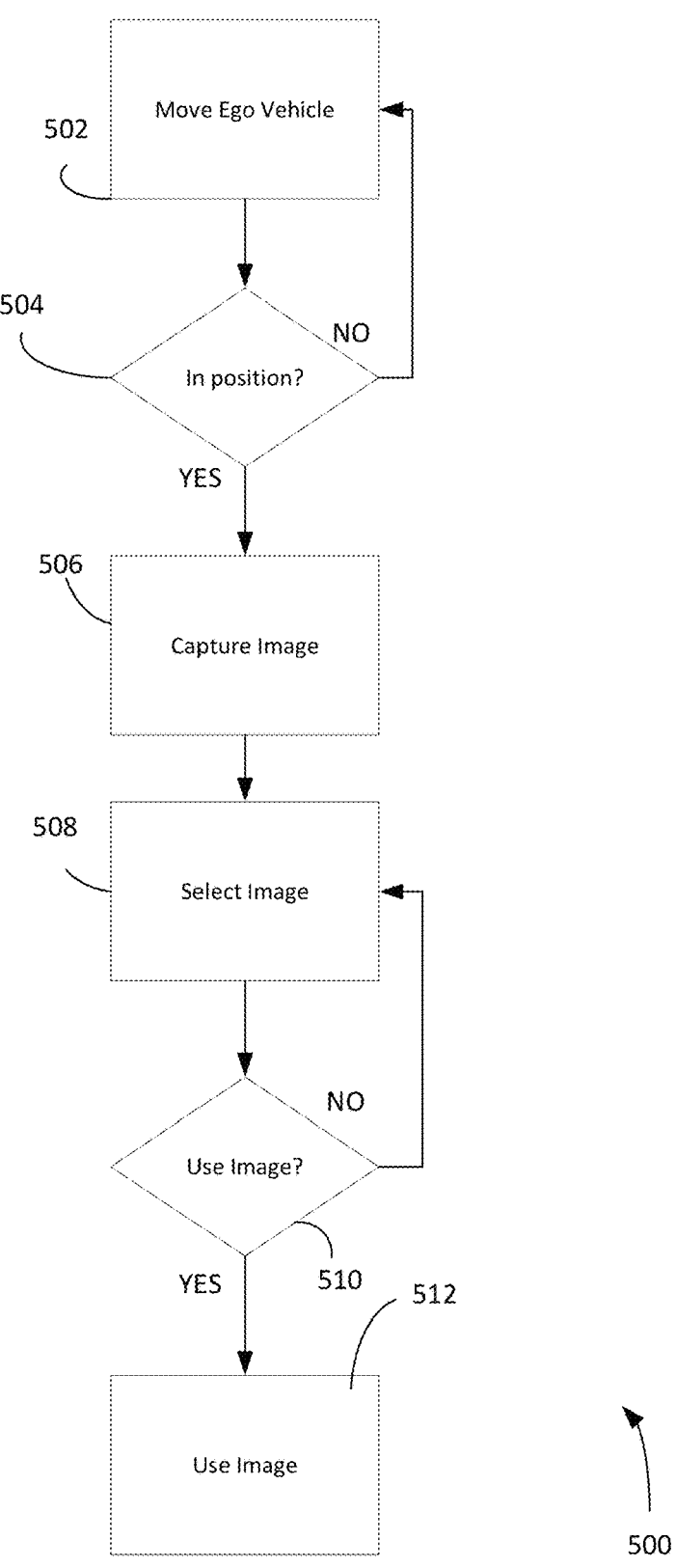
FIG. 5 illustrates a process for moving an ego vehicle according to an example.

FIG. 5 illustrates a process 500 for capturing and using an image (or image data) of an asset, such as a trailer. This process 500 relates to ensuring that the image meets certain minimum requirements for use, so that if the image is used to determine an identifier, there will be a higher probability that the identifier is correct.

At act 502, the ego vehicle, e.g., ego vehicle 302, moves toward or into an area where assets are located. The process 500 may then continue to act 504.

At act 504, the controller (e.g., controller 308 of FIG. 3) determines whether the ego vehicle is in an area where assets are located. If the ego vehicle is determined to be in an area where assets are located (504 YES), the process 500 continues to act 506. If the ego vehicle is determined to not be where assets are located (504 NO), the process 500 returns to act 502. The ego vehicle may have a destination, however, the controller is not checking whether the ego vehicle has reached its destination in this act. Instead, the controller is checking whether the ego vehicle is in an area that may contain assets. For example, the yard may contain assets, but the ego vehicle may begin outside the yard. The ego vehicle could route to the yard, but would not need to capture images (as described with respect to act 506) until the ego vehicle entered the yard.

At act 506, a controller controls a camera or other image capture device on the ego vehicle to begin capturing images of the assets. For example, one or more cameras attached to the ego vehicle, e.g., cameras 304a, 304b of ego vehicle 302, may begin capturing images at a given rate or frequency (for example, 1, 30, or 60 images per second). The cameras may capture images regardless of whether the ego vehicle is moving or still and regardless of whether the ego vehicle is at its destination or traveling to its destination. The images may be captured as discrete images (that is, separate and distinct from each other) or as part of a video.

In some examples, the controller will determine the settings used by a camera to capture the image. The controller may adjust any aspect of the camera's internal settings. In particular, the controller may adjust the field of view of the camera such that the face of the asset containing the asset identifier is a sufficiently large portion of the image to be read, while also not being distorted by the field of view to an extent that reduces readability. The controller also may adjust the flash or constant lighting used to illuminate the asset when acquiring a picture. In some examples, the controller will seek to provide lighting conditions that are as close to natural daylight as possible.

In many examples, the controller may detect the light levels of the environment in which the asset is located using one or more sensors of the appropriate type (for example, light sensors to determine light levels, or by using the camera to capture an image and analyzing the image to determine the light levels or the presence of a condition that affects light levels, such as rain). The controller may adjust the light levels if the controller determines that the light levels are inadequate to provide an image of sufficient quality for determining an identifier. For example, if light levels are poor (for example, because it is dusk or nighttime or otherwise dark out), the controller can control a light, such as a spotlight, floodlight, flashlight, camera flash, and so forth, to activate to increase the light in proximity to the asset and/or to illuminate the asset. The controller can also increase light levels, for example by activating a lamp or other light, responsive to the controller obtaining poor recognition performance over multiple images and assets of identifiers. For example, if the controller is obtaining low confidence in identifiers, the controller may increase light levels by activating a lamp to attempt to improve the useability and/or readability of the images.

Once an image is captured, the process 500 may continue to act 508.

At act 508, the controller selects an image to process. Selection of an image may be according to any desired method. For example, the controller may select the oldest image first (that is, the first image taken), and then move chronologically to the youngest image (that is, the most recent image taken), or according to any other order. If the controller has already selected images for processing, the controller may select a next image to process based on whatever selection criteria are being used. The process 500 may then continue to act 508.

At act 510, the controller determines whether to use the selected image from act 508. The controller may take various factors into consideration to determine whether to use the image. For example, the controller may determine whether the image is sufficiently clear, bright, and/or whether the portion of the image that shows the asset is a large enough portion of the image (e.g., more than 50%, 60%, 90%, and so forth of the image). In some examples, the determination of whether to use an image is made based on whether the front face of the asset is sufficiently clear.

The controller may determine whether an image is sufficiently clear by determining whether an identifier can be found in the image. For example, if an image is too dark or too blurry, the machine learning algorithm may not be able to extract an identifier from the image, and thus the image would be unusable and therefore not sufficient. In some examples, the controller may determine whether an image is sufficient using a set of rules corresponding to various minimum desired conditions. For example, if it is desired that the asset occupy at least 60% of the image, the controller may identify a portion of the image that is occupied by the asset and then compare that portion to the total image to determine whether the asset occupies at least 60% of the image.

If the controller determines that the image is sufficient (510 YES), the process 500 may continue to act 512. If the controller determines that the image is not sufficient (510 NO), the process may return to act 506 or another earlier act.

At act 512, the controller uses the image. For example, the controller may process the image or otherwise use the image in the process 400 described in FIG. 4.

Figure 6A:
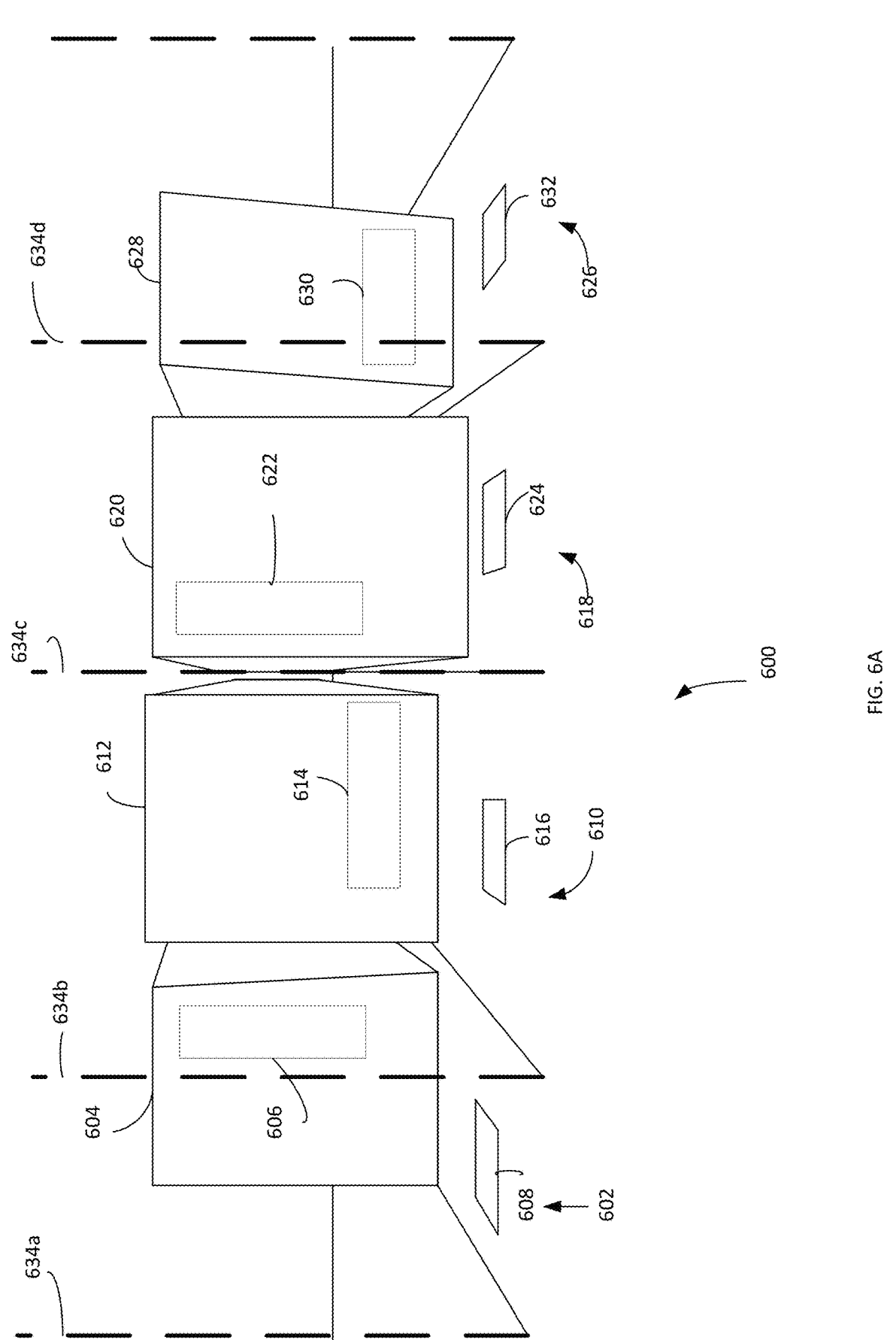
FIG. 6A illustrates a side view of a plurality of parking spaces and assets according to an example.

FIG. 6A illustrates a perspective view of a group of assets 600 in parking spaces ("spaces") 602, 610, 618, 626 according to an example. As discussed below, FIG. 6A illustrates aspects of methods and systems used to determine the parking space (or other location) of an asset within a yard. It is possible to associate parking spaces and assets using an image captured from the ego vehicle and a virtual map of the yard. The ego vehicle, as discussed with respect to FIG. 3, may be equipped with a localization module (for example, localization module 306). The localization module may provide physical location coordinates of the ego vehicle (or a portion of the ego vehicle). For example, the localization module may provide GPS coordinates of the ego vehicle. The virtual map of the yard also may be associated with location coordinates, such that every location in the yard (possibly down to the finest resolution the virtual map supports) is associated with a unique set of location coordinates. In other words, the localization module of the ego vehicle allows the location of the ego vehicle to be known, and the virtual map may be equipped with locations such that the map accurately reflects the location of the ego vehicle, assets, and other objects in the yard in real time.

To map an asset detected in an image to the virtual map of the yard, the ego vehicle uses a method of associating assets with physical locations based on the virtual map, which will be explained in greater detail with reference to FIG. 6A.

FIG. 6A illustrates a first parking space 602 having a first asset 604 including a first asset identifier 606, and an optional first parking space identifier 608, a second parking space 610 having a second asset 612, second asset identifier 614, and an optional second space identifier 616, a third parking space having a third asset 620, a third asset identifier 622, and an optional third space identifier 624, and a fourth parking space 626 having a fourth asset 628, a fourth asset identifier 630, and an optional fourth space identifier 632. Additionally, a plurality of map projection lines 634a, 634b, 634c, 634d separate each parking space 602, 610, 618, 626 from each other space, such that each parking space has a left side map projection line and a right side map projection line.

In some examples, the perspective view of the group of assets 600 reflects a captured image or part or all of captured image data used in the processes described herein (such as processes 400 or 500 of FIG. 4 or 5).

As shown in FIG. 6A, each asset 604, 612, 620, 628 and parking space 602, 610, 618, 626 can be associated with a unique respective identifier. The asset identifiers 606, 614, 622, 630 may be positioned anywhere on any face of the respective assets 604, 612, 620, 628, and may have any orientation (i.e., vertical, horizontal, askew, and so forth). In FIG. 6A, the first asset identifier 606 is vertically oriented on the right side of the first asset 604. The first asset identifier 606 is located closer to the top of the first asset 604 than to the bottom. The second asset identifier 614 is horizontally located at the bottom of the face of the second asset 612 and is closer to the right side of the second asset 612 than the left side. The third asset identifier 622 is vertically oriented on the third asset 620 and is closer to the top and left side of the third asset 620. The fourth asset identifier 630 is horizontally oriented and is located in the bottom, roughly at the center, of the fourth asset 628.

The optional space identifiers 608, 616, 624, 632 also may be at any orientation and located anywhere in a given parking space, but may generally be located in an area of the parking space that is visible (that is, not covered or overlapped by the assets). In some examples, no space identifiers will be present. As the ego vehicle moves through the yard, the ego vehicle may capture one or more images, such as an image similar to FIG. 6A or a portion thereof, that includes multiple assets and parking spaces. The ego vehicle may receive location coordinates (e.g., from one or more localization modules) corresponding to the location of the ego vehicle and/or the ego vehicle's cameras. The ego vehicle (using a suitable computational device, such as a controller) also may derive the location of the cameras or other parts of the ego vehicle relative to the localization module. For example, because the localization module and cameras (or other components) are generally all located on the ego vehicle, and are in fixed relative positions to one another, the ego vehicle can determine the location of the cameras using the fixed relationship between the localization module and other components.

Once the ego vehicle acquires an image, the controller (for example, controller 308 of ego vehicle 302) may project a series of parking spaces onto the image. The virtual map of the yard is likely to be a top-down perspective of the yard (such as that shown in FIG. 1), but may be shown from any perspective or even be a 3-dimensional map. The image of the assets 604, 612, 620, 628 may be a side-view (that is, orthogonal or approximately orthogonal) relative to the virtual map. The controller may, therefore, based on one or more location coordinates corresponding to the boundaries of a parking space 602, 610, 618, 626 determine a projection based on the top-down perspective of the virtual map onto the side-view perspective of the captured image. The projection based on the top-down perspective onto the side-view is indicated by the plurality of projection lines 634a-d. The plurality of projection lines 634a-d may be superimposed onto the captured image. The controller may use the range finder system data combined with the localization module data to determine the asset state (that is, the pose, height, and so forth). The controller may simplify this data into a rectangular box (or similar icon) that may be superimposed onto the virtual map of the yard to show the asset pose and/or state on the virtual map. For example, an asset may be represented as a rectangular box superimposed onto a virtual map of the yard showing the pose of the asset in the yard. Such a UI may have an appearance substantially the same as the actual yard depicted in FIG. 1 or 2.

In one example, the controller uses the range finding systems (e.g., LIDAR) to determine one or more asset cuboids based on the point cloud returned by the range finding systems. The asset cuboids may be boundaries (e.g., rectangular boundaries) corresponding to the asset's position on the virtual map. The controller may estimate the parking status of the parking space and then associate an asset to the parking space based on a machine learning algorithm and/or based on whether the cuboid of the asset occupies at least a threshold portion of the parking space. For every parking space observed in this way, the occupancy of the space is known (e.g., whether the space is free or occupied), the pose of the asset in the space is known (if the space is occupied), and the asset identifier of the asset is known (if the space is occupied).

The controller can analyze the image with the projection to determine which asset identifiers 606, 614, 622, 630 are in between two adjacent projection lines 634a-d. For example, second asset identifier 614 is between projection line 634b and projection line 634c. Thus, the controller may determine that, since the second asset identifier 614 lies between the projection lines 634b, 634c that the second asset 612 corresponding to the second asset identifier 614 must be located at the spot demarcated by those projection lines 634b, 634c—that is, the second asset 612 must be located in the second parking space 610. In some examples, the controller further may be configured to identify any label of the parking space. For example the second space identifier 616, and determine that the second space identifier 616 and second asset identifier 614 are between the same two projection lines 634b, 634c, and thus the identifier of the second space is the second space identifier 616. In some examples, the controller can analyze a sequence of images to determine the location of asset identifiers 606, 614, 622, 630. For example, if a first image is inconclusive as to whether an asset is at a given location (e.g., a given parking space), the controller may consider a second image or multiple additional images.

In other examples, the controller also may rule out some assets as being in a given spot. For example, the asset identifier 606 is located between the two projection lines 634b, 634c. However, it is clear from visual inspection of FIG. 6A that the first asset 604 corresponding to the first asset identifier 606 is not fully within (or even completely within) the projection lines 634b, 634c. The controller may determine that the first asset identifier 606 is associated with the first asset 604, and further may determine that at least a threshold portion of the first asset 604 is not within the projection lines 634b, 634c, and may rule out the first asset 604 as being in the second parking space 610. The controller may determine a likelihood that a given parking space is associated with a given asset identifier and use the likelihood to determine which asset is believed and/or considered to be located at a given parking space. In some examples, a machine learning algorithm may be used to identify whether an asset is in a given space based at least in part on features of one or more images of the asset and space.

In some examples, the controller determines which location an asset is located at by referencing the virtual map (which may be in a global coordinate frame) and comparing the pose of the ego vehicle (which is determined relative to the global coordinate frame) to the virtual map, to determine a location of the ego vehicle on the virtual map. The controller may, using the relationship between the location of the ego vehicle and the cameras on the ego vehicle (the relationship being known or predetermined), transform the projection in the image of the asset to coordinates in the global coordinate frame. When the ego vehicle uses the range finding systems (e.g., LIDAR), the point cloud data from the range finding systems can be transformed into distances relative to the ego vehicle and then transformed into coordinates in the global coordinate system as well. In some examples, such as using a range finding system or image analysis system, the controller may determine a given asset occupies more than one parking spaces. For example, if an asset is askew and has portions in a first parking space and a second parking space, the controller may find the boundaries of the asset, compare it to the boundaries in the projection on the image, and conclude that an asset occupies multiple spaces. In some examples, the controller may determine that the askew asset is located in the bounded region where a majority of the asset is situated, and that the other bounded regions occupied by the asset are blocked by the asset and/or not available for parking a second asset. In some examples, in the top-down perspective (of the virtual map), an askew asset, measured using the range finding systems, may appear to overlap a boundary because the asset is or appears to be in two spaces according to the ego vehicle. In such a case, the controller and/or an external computer system or server, may determine that the asset occupies two or more spaces. Thus, even if an asset identifier or front face is completely within a bounded region, the controller can still determine that other parts of the asset occupy other bounded regions.

In some examples, parking spaces and assets can be associated with one another using a map of the yard that contains a space corresponding to each parking space. The map of the yard may be true-to-scale, meaning that each parking space and other feature of the map may be accurate, relative to each other parking space of feature, with respect to at least size, orientation, position, and so forth. In various examples, the map of the yard may be associated with location coordinates, such as GPS coordinates, such that the location of the ego vehicle on the map may be accurately inferred using, for example, the localization module of the ego vehicle.

In some examples, the controller may determine the parking spaces of more than one given asset using a single image. In some examples, the controller may use a batch of images (that is, more than one image) to determine which parking spaces are associated with which assets. In some examples, more than one image may be used to determine a likelihood that a given parking space contains a given asset.

The controller may use the processes, methods, and systems described herein to determine the values of the asset identifier and/or space identifier.

In summary, the controller, based on the ego vehicle's location, may use one or more images to determine the location of assets by using the asset identifier to determine an identity of the asset, and then by determining a parking space where that asset is located on a virtual map. The controller may provide any information it collects or determines to external systems, such as external databases.

Figure 6B:
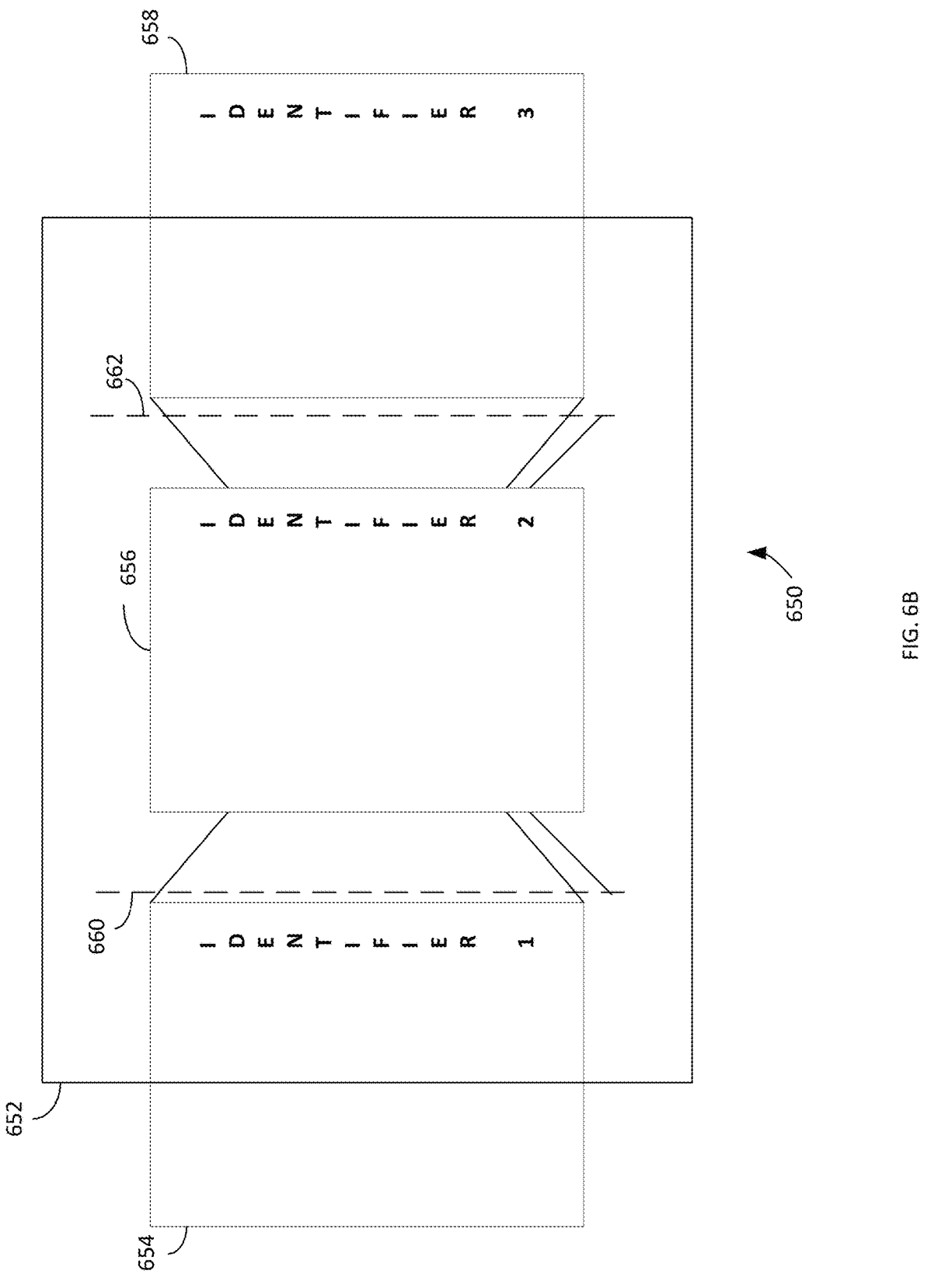
FIG. 6B illustrates a plurality of assets in a view according to an example.

FIG. 6B illustrates a scene 650 having a plurality of assets. The scene 650 includes a view 652, a first asset 654, a second asset 656, a third asset 658, a first boundary line 660 ("first boundary 660"), and a second boundary line 662 ("second boundary 662"). The scene 650 illustrates a situation similar to the group of assets 600 of FIG. 6A.

The view 652 corresponds to the image an image sensor mounted on the ego vehicle (such as a camera) would capture while traversing the yard. That is, the area within the view 652 may correspond to the actual image captured by the image sensor.

The first asset 654 is an asset, such as a trailer. The second asset 656 is an asset, such as a trailer. The third asset 658 is an asset, such as a trailer. Each asset 654, 656, 658 contains a unique identifier on the right region of said asset's face (though, in some examples, the identifiers may be located anywhere on the face, and may be horizontal or vertical). The first and second boundary lines 660, 662 define the sides of a bounded region. For example, if the second asset 656 is located in a parking space that is defined as a bounded region on the virtual map, the first and second boundaries 660, 662 indicate the sides of that bounded region in the perspective of the view 652.

The ego vehicle and/or asset ID system (e.g., the asset ID system 700 of FIG. 7) may identify an asset in a bounded region and associate that asset with the bounded region. In reaching a determination on whether a given asset is located in the bounded region, the system and/or ego vehicle may use an image with the least perspective distortion at the center of the bounded region.

For example, with respect to the view 652, the bounded region defined by the first and second boundaries 660, 662 is located in the center of the view 652. In this example, the center of the bounded region defined by the first and second boundaries 660, 662 is located exactly in the center of the view 652, however, the center of the bounded region could be located near or approximately at the center of the view 652. Because the center of the view 652 has the least distortion due to perspective (because it is directly in front of the camera lens), the system and/or ego vehicle may rely on the view 652 to determine which asset is located in the bounded region defined by the first and second boundaries 660, 662. The analysis (e.g., via a machine learning algorithm) may determine that the face of the second asset 656 is most closely related to the center of the bounded region (in this example, because the face of the second asset 656 overlaps with the center of the bounded region and lies between the first and second boundaries 660, 662), and may then associate the identifier located on the face of the second asset 656 with the bounded region.

In some examples, assets may not be located in discrete bounded regions (e.g., assets may be located in more than one bounded region). In one example, the faces of two or more assets may be present between the first and second boundary 660, 662 even when the camera (and the view 652) are directed at the center of the bounded region. In such examples, the system may associate the identifier of each asset at least partially within the bounded region with the bounded region. For example, if the faces of the first asset 654 and second asset 656 were both between the first and second boundaries 660, 662 when the view 652 was centered on the bounded region defined by the boundaries 660, 662, then the system could associate both the identifier for the first asset 654 and the identifier for the second asset 656 with the bounded region.

In some examples, parts of an asset may lie within one or more bounded regions. For example, the first asset 654 may be askew such that part of it crosses the first boundary 660 and is in the bounded region defined by the first and second boundaries 660, 662. In some examples, the ego vehicle and/or system may use range-finder data (e.g., a point-cloud returned by a LiDAR system) to determine that the first asset 654 at least partially lies within the bounded region, and may associate the identifier of the first asset 654 with that bounded region. In some examples, the system may determine the exact pose of the first asset 654 and/or the percentage or portions of the first asset 654 which are in the bounded region.

With respect to FIG. 6A, note that in some cases multiple identifiers may be visible in a given image (e.g., a given view) within a single bounded region (e.g., between the projection lines 634b, 634c as with respect to the first asset identifier 606), but the asset may not actually be located in that bounded region. In such cases, the system and/or ego vehicle may take a sequence of images as data with which to model the probability that the asset (e.g., the first asset 604) is located within a given bounded region. However, as with FIG. 6B, the system and/or ego vehicle may only update the virtual map and the identifier associations when the system and/or ego vehicle receive an image where the center of the view corresponds to the center of the bounded region.

In some examples, the ego vehicle and/or system may determine whether a given view corresponds to the center of a bounded region by comparing the location and pose of the camera (which may be known because the camera may be located in a known position on the ego vehicle, and the position and/or pose of the ego vehicle may be determined from the location modules) to a vector assigned to the center of a bounded region and directed away from the center of the bounded region in a direction orthogonal to the path of the ego vehicle. The ego vehicle and/or system may also determine a vector from the center of the camera lens (or image sensor's sensor), and determine the relationship between the bounded region vector and the image sensor vector to determine whether that relationship indicates that the view is directed at the center of the bounded region. Note that the distance of the ego vehicle from the bounded region may be known (e.g., via the location modules).

Figure 7:
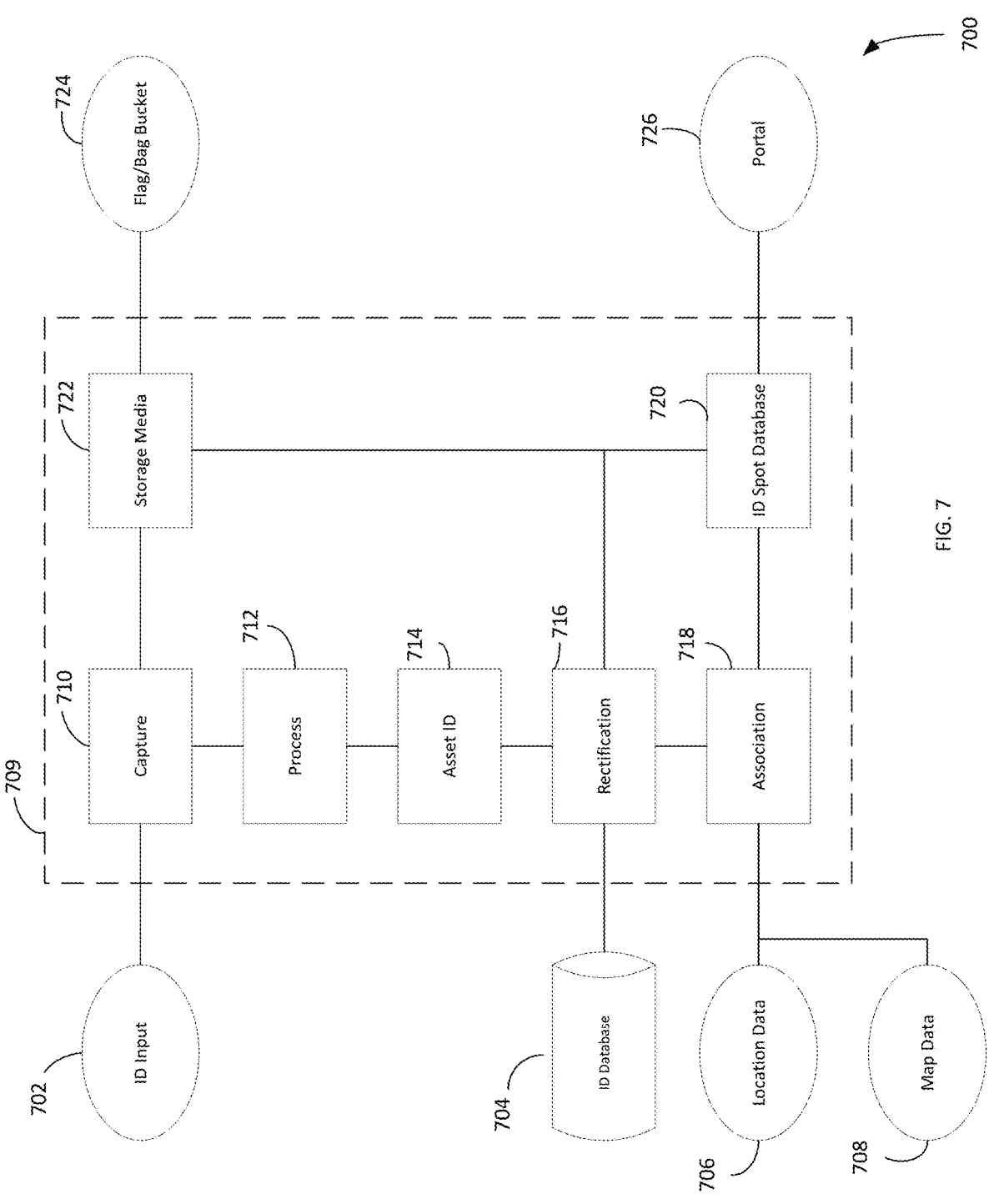
FIG. 7 illustrates a block diagram of a system for determining an identity of an asset according to an example.

FIG. 7 illustrates a block diagram of an asset ID system 700 according to an example. The asset ID system 700 is a system capable of determining the asset identifier of an asset and associating the asset with a given location, such as a location on a virtual map.

The asset ID system 700 includes an ID input 702, an ID database 704, a location data input 706, a map data input 708, an on-board system 709, a flagged output 724, and a user portal 726. The on-board system 709 includes a capture module 710, a process module 712, an asset ID module 714, a rectification module 716, an association module 718, an ID spot database 720, and storage media 722 (such as a disk, solid state memory, or other form of memory or storage).

The on-board system 709 of asset ID system 700 may be located on the ego vehicle. For example, the on-board system 709 may include one or more cameras, one or more localization modules, one or more range finder modules, one or more controllers, various kinds of communication equipment, and so forth, all of which would be located on and/or coupled to the ego vehicle, and which could travel with the ego vehicle.

The ID input 702 is an input for image data (for example, one or more images or video streams) or other data that can be used to identify an asset. For example, the ID input 702 may provide data output from a camera or similar device.

The ID database 704 is a database of known asset identifiers and may also include associated asset state data. There are numerous commercially available databases that can store trailer and other asset identifiers (such as the PINC™ database or other Yard Management Systems—however, these databases do not store asset state data, including at least asset pose data). In some examples, the ID database 704 may also include standards or rules for validly formed identifiers (e.g., the BIC™ standard). The on-board system 709 may access the ID database 704 to review and/or retrieve identifiers contained with the ID database 704. The ID database 704 may be used to help reduce uncertainty in identifiers, as described in more detail herein. The ID database 704 may be updated as assets enter and leave the yard. For example, asset identifiers and associated asset state data may be entered into the ID database 704 when the asset enters the yard, and may be removed from the ID database 704 when the asset leaves the yard.

The location data input 706 is an input for location data. The location data input 706 may provide location data corresponding to the location of the ego vehicle to the controller and/or association module 718.

The map data input 708 is an input for data relating to the virtual map of the yard. For example, the map data input 708 may be a wireless transmission module capable of communicating with a database hosting the virtual map, or it may be part of the on-board system 709 if the virtual map is available in the storage media 722 or other memory of the on-board system 709. The map data input 708 may provide map data relating to the virtual map of the yard to the association module 718.

The capture module 710 is a module that captures image data, such as images, and/or other data from the ID input 702. For example, the capture module 710 may be code, executable by one or more processors, stored on a non-transitory, computer-readable medium, and/or the capture module 710 may be a hardware circuit that is configured to receive image data from the ID input 702 and which may operate the camera or other device used to capture image data or other data. The capture module 710 may be part of the controller or separate from the controller. The capture module 710 may store, in the storage media 722, the image data provided via the ID input 702. The capture module 710 also may provide the image data to the process module 712.

The process module 712 processes the image data provided by the capture module 710. For example, the process module 712 may carry out at least act 406 of process 400 of FIG. 4. The process module 712 may make any desired alterations or changes to the captured images of the image data to render the images suitable for use. In some examples, suitable for use means that a valid or likely valid asset ID can be extracted from the image for at least one asset.

Processing the image data may include adjusting the format of the image data from a format used by the capture module 710 to a format used by the rest of the pipeline and/or on-board system 709 (e.g., the process module 712 through at least the association module 718). Processing the image data may also include resizing the image to strike a balance between recognition accuracy, processing speed, and runtime memory efficiency. For example, too small an image may suffer from artefacts caused by compression processes, while too large an image may require an excessive amount of memory or be larger than is needed. Processing the image data may also include removing distortions from the image. Some types of camera might distort the image (e.g., large FOV cameras, fish-eye cameras, and so forth). The processing module 712 may correct distortions due to the type of camera lens. Processing may also include smoothing or denoising the image, adjusting brightness or contrast, converting to greyscale, or adjusting any other image characteristic of the image data. The process module 712 may provide the processed images to the asset ID module 714.

The asset ID module 714 extracts at least one asset identifier from the image data. For example, the asset ID module 714 may use one or more images to determine the asset identifier of an asset shown in the one or more images. The asset ID module 714 also may extract one or more parking space identifiers or other types of identifier and/or text from the image.

The asset ID module 714 may determine identifiers by first finding a portion of an image (from the image data) that is likely to contain or does contain an identifier. The asset ID module 714 may take the portion of an image containing the identifier and segment the identifier into a sequence of symbols. The asset ID module can identify a value of each symbol of the sequence of symbols, and then recompose the identifier based on the values of the symbols. The asset ID module then may take the extracted asset identifiers and/or other identifiers and provide them to the rectification module 716. In some examples, the asset ID module 714 may execute a process described herein, such as the process 400 of FIG. 4, to determine the asset identifier.

The rectification module 716 may determine if an asset identifier is erroneous, or if an asset identifier does not match a known asset identifier, or may correct an incorrect asset identifier. In some examples, the rectification module 716 may determine a likelihood that an asset identifier is erroneous (that is, that the asset ID module 714 failed to determine the correct asset identifier for the asset). The rectification module 716 may correct an erroneously determined identifier (that is, if the asset ID module 714 erroneously identifies an asset, the rectification module 716 may correct the identifier to a correct value).

For example, the rectification module 716 may have access to identifiers contained in the ID database 704. The ID database 704 may be updated at various times to contain only identifiers associated with assets currently located within the yard. For example, as an asset arrives in the yard, the ID database 704 may be updated to contain that asset's unique identifier. As an asset leaves the yard, the ID database 704 may be updated to remove that asset's unique identifier. The rectification module 716 can compare an identifier to the stored identifiers in the ID database 704. If the identifier matches the stored identifier, the rectification module 716 may determine that the identifier was correctly identified by the asset ID module 714.

The rectification module 716 may determine that the asset identifier is not present in the ID database 704. The rectification module 716 may compare the identifier to stored identifiers contained in the ID database 704 to determine a best-fit, closest match, or otherwise similar stored identifier and determine that the identifier should be or should have been the best-fit or closest match or otherwise similar stored identifier. The rectification module 716 may update the identifier accordingly.

In some examples, the rectification module 716 may use data other than the stored identifier (such as asset state data) to determine a match. For example, the asset may have a unique color or other physical characteristic (such as unique damage or graffiti) that is stored in the ID database 704 or is otherwise known (possibly because the asset state data was collected by the asset ID system 700 and stored in the storage media 722 or ID spot database 720 or elsewhere, or because the asset state data was stored and/or collected during a previous time the asset was in the yard). The rectification module 716 may identify the asset based on the unique, non-identifier characteristics of the asset, and then select the correct asset identifier to associate with the asset. Likewise, the rectification module 716 may use other data (such as asset state data) to confirm that the asset ID module 714 correctly identified an asset. For example, the asset ID module 714 may provide an identifier that is correct, and the rectification module 716 may verify the correctness of the identifier by verifying that the asset state data of the asset matches the stored asset state data from when the asset was first processed (e.g., when the asset entered the yard).

In the foregoing examples, the rectification module 716 may use machine learning or probabilistic algorithms to determine a confidence that an identifier is correct. The rectification module 716 may determine that an identifier is incorrect if the confidence that the identifier is correct is below a threshold confidence level, and may correct an incorrect identifier if the confidence that the new identifier is correct exceeds a threshold confidence level.

The association module 718 may receive the location data pertaining to a location of the ego vehicle from the location data input 706. The association module 718 also may receive information related to the ego vehicle's orientation and any other data about the physical characteristics or positioning of the ego vehicle. The association module 718 also may receive the virtual map data from the map data input 708. The association module 718 determines the parking space and/or location of an asset corresponding to the asset identifier extracted by the asset ID module 714. For example, the association module may perform the virtual map projection (described herein, for example with respect to FIG. 6A and FIG. 6B) to determine which position a given asset occupies. Once the association module 718 has determined the location of a given asset, the association module 718 may provide the location and asset identifier to the ID spot database 720.

The ID spot database 720 is a database, which may be maintained as part of the on-board system 709, that contains the location of each asset in the yard, including those assets identified and associated with a location by the association and asset ID modules 714, 718. The ID spot database 720 may be part of the storage media 722 or may be separate. The ID spot database 720 may be updated in real-time as the ego vehicle patrols the yard, identifies assets, and associates those assets with locations. The ID spot database 720 also may be updated based on inputs from the portal 726. For example, a different ego vehicle may be updating asset locations in real-time as well, and the ID spot database 720 may receive the updated asset location data from the other ego vehicle either directly from the other ego vehicle or through an intermediary system that communicates with the other ego vehicle (for example, via the portal 726). The spot database 720 also may provide the updated asset location data to the portal 726 so that the data can be promulgated to other ego vehicles and other ID spot databases.

The storage media 722 may be any medium and/or media capable of storing data. For example, the storage media 722 may be any type of computer memory.

The flag output 724 may be an output for asset identifiers and/or image data that have low certainty (that is, are likely incorrect) or are known to be incorrect. Incorrect data may be used to improve the performance of the asset ID system 700 by being provided to the machine learning algorithms and other devices that are trained to identify assets identifiers and assets. The incorrect or likely incorrect data may be verified and/or corrected, as need be, and may be used to train the machine learning algorithms further to reduce the likelihood of future errors and to improve the certainty of asset identifiers and other identifiers.

The portal 726 may be an externally hosted service, such as a cloud-based application, an external server, another ego vehicle, a user interface, and so forth. The portal 726 may receive any data available to the on-board system 709 and may use that data for any purpose, including updating the ID spot databases 720 and machine learning algorithms of other on-board systems.

Among the data collected, stored, and transmitted and/or received, the data may include not only asset identifiers and locations, but also measurements of the certainty that an asset was correctly identified and the time the identification was made, and so forth.

In some examples, the asset ID system 700 also may capture and retain asset state data (e.g., asset pose data, height, and spacing data for assets), for example, by using the range finding systems described herein. The data may be stored in the storage media 722 or provided to the portal 726 or other ego vehicles and/or asset ID systems. The asset state data (including the asset pose data) may be used to populate the virtual map so that an end user can see the location and pose of the asset, as well as other information related to the asset, for example, asset tracking data (which includes when the asset was last viewed at its current location, how long the asset has been at the location, confidence in identifiers associated with the asset, and so forth), and asset state data.

As discussed herein, a virtual map of the yard may be maintained on the ego vehicle or elsewhere. The virtual map may resemble FIG. 1. For example, the virtual map may include bounded regions that correspond to each parking space of the pluralities of parking spaces 102, 104, and may include defined regions for the boundaries of the yard (e.g., may define the yard boundary 108), yard buildings, such as building 106, and so forth.

Figure 8A:
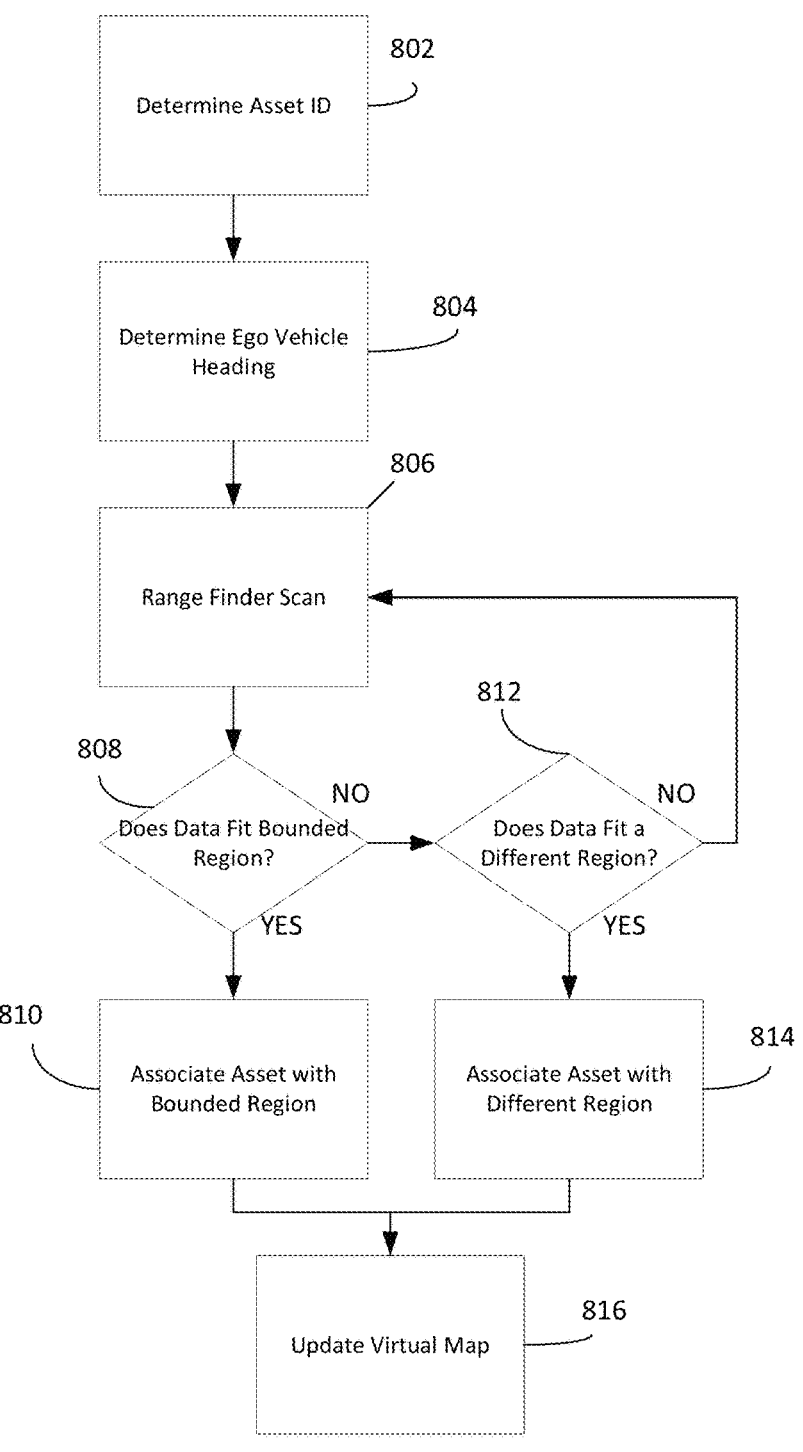
FIG. 8A illustrates a process for updating a virtual map according to an example.
Figure 8A:

The process 800 of FIG. 8A illustrates one example of a method to populate a virtual map of the yard 100 with data. FIG. 8A may be used to populate the virtual map with asset pose data. For example, FIG. 2 may depict a portion of the virtual map containing parking spaces populated with asset cuboids depicting the location and pose of the asset super-imposed on the virtual map of the parking spaces.

At act 802, the controller determines the asset identifier of an asset. The controller may determine the asset identifier using methods and approaches described herein, for example, the process 400 of FIG. 4. The process 800 may then continue to act 804.

At act 804, the controller determines a heading (that is, an orientation) of the ego vehicle and may determine a location of the ego vehicle. The controller may also already have a location of the ego vehicle. The heading and location of the ego vehicle may be used to convert the relative location of assets near the ego vehicle to absolute location values. The heading may be with respect to a position of the virtual map of the yard or a geographic or spatial point of reference (for example, true north, magnetic north, and so forth). The controller may determine the heading of the ego vehicle using the localization modules of the ego vehicle. The controller also may determine a confidence (e.g., of the correctness) of the location and heading determination.

In some examples, the controller may convert the heading and location of the ego vehicle (or other ego vehicle pose data) from local to global coordinate frames using a multi-step process. The multistep process may also be applied to converting the heading and location of assets from local to global coordinate frames. The multistep process may include constructing a local coordinate system using the location of the ego vehicle or a localization module of the ego vehicle as the origin of the coordinate system. This frame of reference may be referred to as the ego coordinate frame. Using range finder systems, the controller may determine the pose and/or state of assets near the ego vehicle in the ego coordinate frame. If the location of the ego vehicle is known through the localization module, and the position of assets relative to the ego vehicle are known, the assets and ego vehicle can be converted from the ego coordinate frame to the global coordinate frame. Likewise, if the ego vehicle contains two or more localization modules, two or more location coordinates can be associated with the ego vehicle and transformed from the ego coordinate frame to the global coordinate frame. Such a process may include converting vectors representing assets and/or the ego vehicle from one frame of reference to another.

The process 800 may then continue to act 806.

At act 806, the controller may control range finding systems (for example, LIDAR) of the ego vehicle to sense the position of the asset corresponding to the asset identifier of act 802. In some examples, the range finding system may return a point cloud of points corresponding to edges and/or faces of the asset and/or other nearby assets or objects. The process 800 may then continue to act 808.

At act 808, the controller fits a rectangle (or other polygon) to the point cloud data and determines whether the rectangle fits to a bounded region of the virtual map. For example, each parking space may be a bounded region of the virtual map. Using the location data for the position and heading of the ego vehicle, and/or using the image data used to acquire the asset identifier and associate the asset with a parking space (as described with respect to FIG. 4), the controller can determine if the point cloud corresponding to the asset occupies one or more parking spaces in the yard.

For example, each point will return as a given distance from the ego vehicle. Knowing the ego vehicle's orientation and/or location, the distance from the ego vehicle of a point can be used to determine the location of that point in the global coordinate system of the virtual map. Using the point cloud, the controller can form an occupancy grid. Using the occupancy grid and the parking space information from the virtual map, the controller can create a rectangle that fits the point cloud data and provides an outline of the dimensions of the asset.

To determine whether an asset occupies one or more parking spaces in the yard, the controller may determine a likely area occupied by the asset based on the point cloud and/or rectangular representation of the asset, and may determine that a parking space is occupied responsive to the point cloud elements and/or rectangular representation of the asset occupying a minimum threshold of the parking space.

The controller also can use the point cloud and/or rectangular representation and the location data to determine an orientation of the asset. For example, the controller can determine that the asset is askew in the space, such that the asset occupies a front portion of one parking space and a back portion of another parking space (as would be the case with any of the assets 206 of FIG. 2 that occupy more than one spaces), or whether the asset is askew but occupying only one parking space.

The controller also can determine an uncertainty associated with the physical position and orientation of the asset, and may require a certainty over a threshold certainty to determine that the asset occupies a given parking space. Because the virtual map is to scale, the controller can also determine the length and width of the asset. Thus, in some examples, the controller can use the heading and position of the ego vehicle, the point cloud, the length and width of the asset, the bounded regions on the virtual map, the portion of a parking space occupied by the asset, and any certainty measurements and/or thresholds to determine the exact position of the asset on the virtual map.

If the controller determines that the position of the asset corresponds to a bounded region of the virtual map, such as a parking space or group of parking spaces, the process 800 may then continue to act 810. If the controller determine that the position of the asset does not correspond to a bounded region, the process 800 may continue to act 812.

At act 810, the controller associates the asset and corresponding asset identifier with the bounded regions the controller determined the asset to be occupying, as well as with any identifiers associated with those bounded regions (for example, parking space identifiers). The process 800 may then continue to act 816.

At act 812, the controller determines if the data acquired thus far fits a different region than a bounded region. For example, the asset may be located in an aisle or in a non-standard parking area that isn't considered a bounded region on the virtual map. If the data fits a different region (812 YES), the process 800 may continue to act 814. If the data does not fit a region (812 NO), there may be an error or other issue, and the process 800 may return to act 806.

At act 814 the controller may associate the asset with a new region that the controller may define. For example, the controller may use the dimensions of the asset and the location data to associate one or more boundaries of the asset with specific location coordinates (e.g., GPS coordinates) corresponding to coordinates on the virtual map. In this way, the controller can define a region, such as an ordinarily open space in the yard, as containing an asset. These regions need not be parking spaces, but can be any space, and need not be associated with any identifier, such as a parking space identifier. For example, regions may include areas in the aisle or road that are not designated or marked for parking, grassy areas, loading docks, and any other physical space within the yard. The process 800 may then continue to act 816.

At act 816, the controller may update the virtual map with the locations and associations determined in acts 808, 810, 812, and 814. The controller may update on-board copies of the virtual map as well as remotely hosted copies of the virtual map. The controller may provide the virtual map any data collected during any process described herein, including asset identifiers, parking space identifiers, point clouds, height data, length and width data, time data corresponding to when determinations or processes were made, confidences in the correctness of the data, and so forth.

The bounded regions may correspond to database entries (e.g., a bounded region, corresponding to a parking space, may be associated with a database entry and the identity of an asset). As a result, when the asset in a bounded region does not match the asset in the database, the database may be updated and the time of the last update of that database entry (and/or of the database) may be updated to the time at which the asset in the bounded region was last identified (e.g., the current time).

Figure 8B:
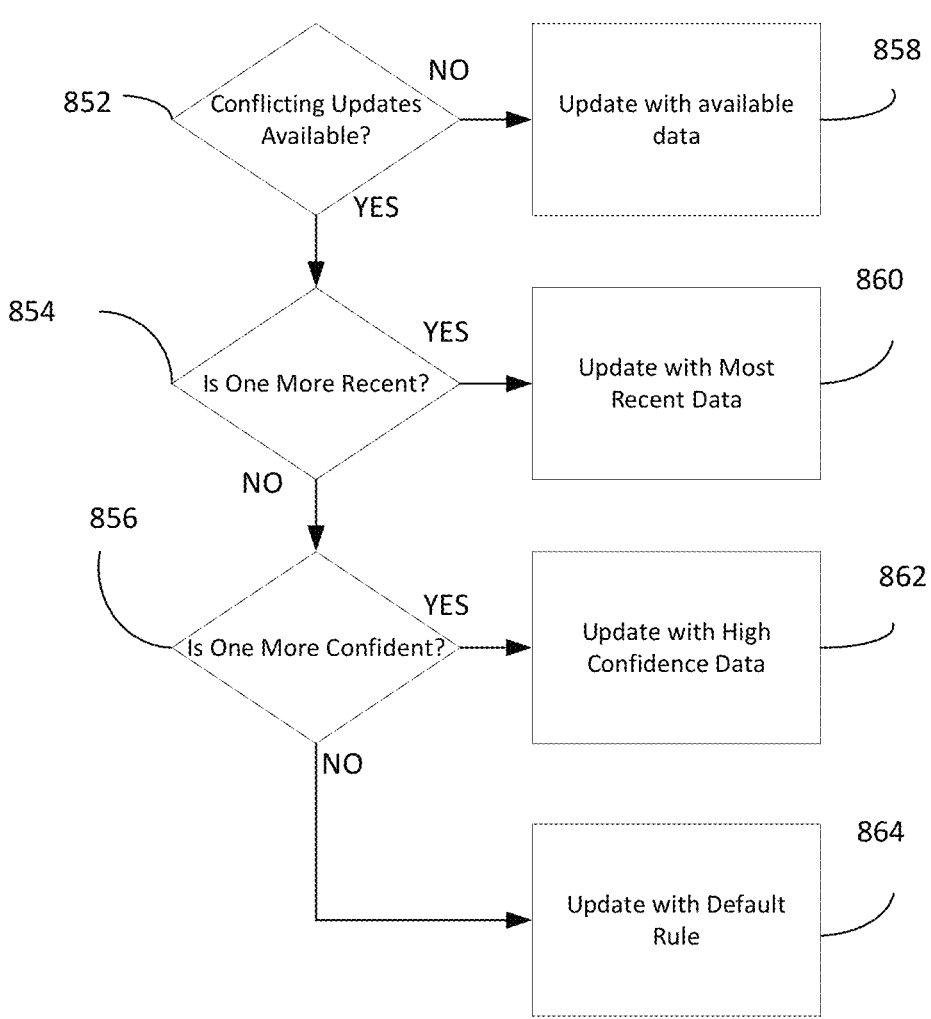
FIG. 8B illustrates a process for updating a virtual map according to an example.
Figure 8B:

FIG. 8B illustrates a process 850 for resolving race conditions in data when updating the virtual map. At various times, updates to the virtual map may be received that are conflicting. For example, two observations may occur close in time but indicate conflicting information about the location of an asset or the asset occupying a given location. One example of such a situation may arise when a first ego vehicle identifies an asset in a space at a first point in time, shortly later the asset is moved and then a second ego vehicle determines that the space is unoccupied. Another potential situation may arise if two ego vehicles have different information regarding an asset or space, but neither has updated the "master" version of the virtual map yet (for example, the less recent measurement could be pushed to update after the more recent measurement, based on when the ego vehicles are once again in communication with the master virtual map).

At act 852 the controller determines if conflicting updates are available. If a conflicting update is not available (852 NO), the process 850 continues to act 858 in which the controller is updated with available data. If a conflicting update is available (852 YES), the process 850 continues to act 854.

At act 854, the controller determines which update is the most recent. If the controller determines there is a most recent update (854 YES), the process 850 continues to act 860 in which the controller is updated with most recent data.

At act 856, the controller determines whether the confidence in one of the updates is greater than the confidence in the other updates. If the controller determines that one update has a higher confidence than the other updates (854 YES), the process 850 continues to act 862 in which the controller is updated with high confidence data. If the controller determines that none of the updates has a greater confidence than the others (or, alternatively, that none of the updates is sufficiently more confident than any other update) (854 NO), the controller may select data to use or flag data for review or the process 800 may continue to act 864.

At act 864, the controller updates the virtual map according to a default rule. For example, in some cases, the default rule may be—when updates are approximately equally confident and were made at the same time, to update using the first data received by the controller or to raise an error of flag if the data does not match.

As mentioned above, at act 858, the controller updates the virtual map (either or both of the master copy or the local copy) with the available updated data. At act 860, the controller updates the virtual map with the most recent data. At act 862, the controller updates the virtual map with the highest confidence data.

The acts of process 850 may occur in any order. For example, act 854 may follow act 856. That is, the controller may determine recency after determining confidence, or determine confidence after determining recency. In some examples, the controller may determine confidence and recency simultaneously.

Figure 9:
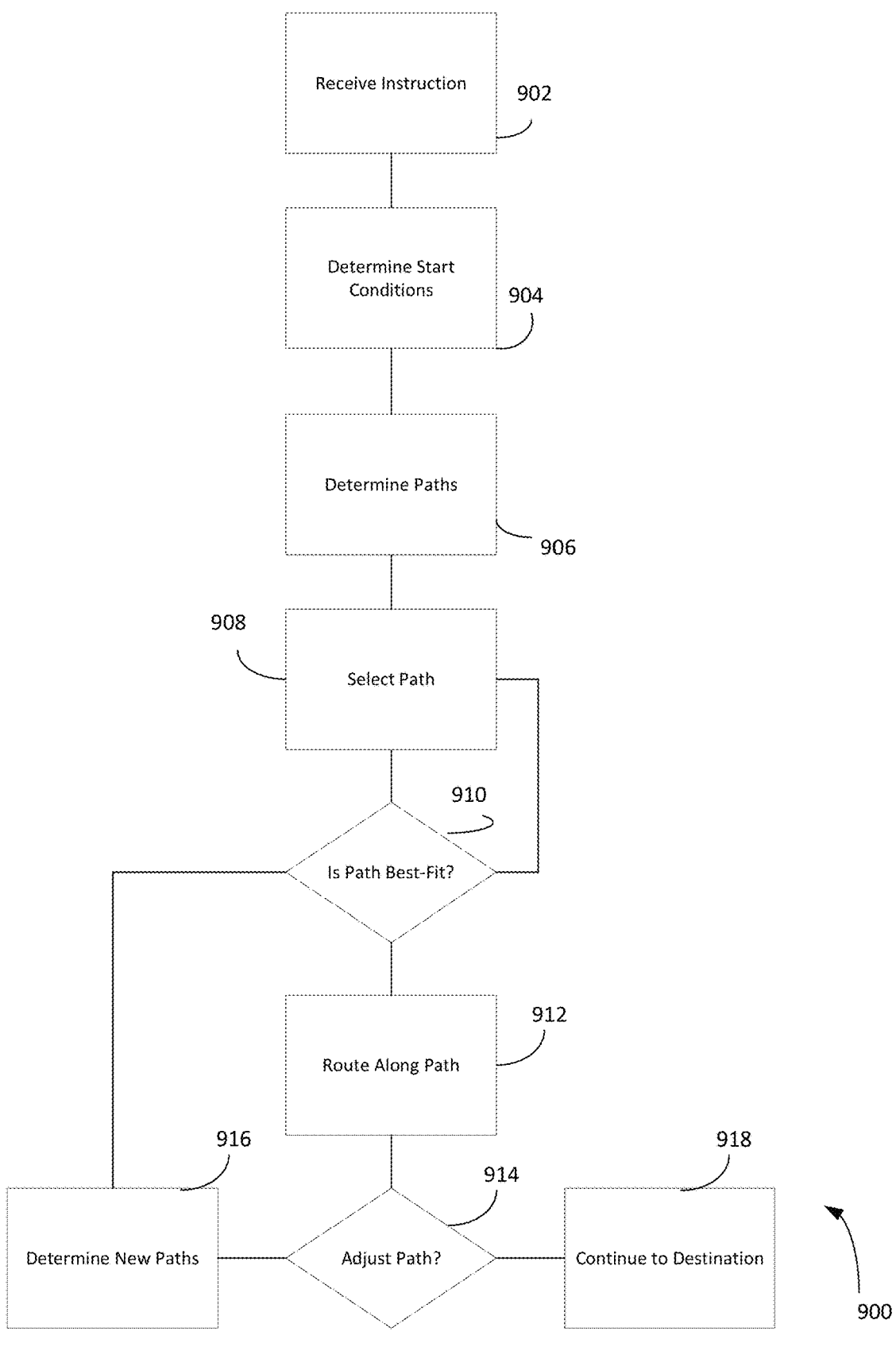
FIG. 9 illustrates a process for routing an ego vehicle through a yard according to an example.

The ego vehicle may operate autonomously or semi-autonomously. The virtual map may be used by the ego vehicle to determine a best-fit route to a parking space or other location. FIG. 9 illustrates a process 900 for determining a route. The best-fit path is a path that allows the ego vehicle to carry out its current task, but which may also allow the ego vehicle to carry out other tasks provided the other tasks do not significantly detract from completing the current task. The best-fit path will be discussed in greater detail with respect to act 910.

At act 902 the ego vehicle receives an instruction. For example, the ego vehicle may receive (via a communications interface) an instruction instructing the ego vehicle to perform one or more tasks. These tasks can include moving an asset, aligning an asset occupying multiple bounded regions with a single bounded region, patrolling the yard to update data, returning to a charging or fueling station, going to a specific location, idling (e.g., remaining stationary), and so forth. A controller can then interpret the instruction and control the ego vehicle to execute the instruction, for example by issuing commands to actuators on the ego vehicle. The tasks may include monitoring the yard, updating asset state data for assets in the yard, or using any of the additional tools attached to the ego vehicle to move assets between various locations (e.g., to move an asset from point A to point B). The process 900 may then continue to act 904.

At act 904, the controller determines the initial conditions for carrying out the task. For example, controller may query the virtual map to determine the locations of one or more assets and/or the locations of one or more parking spaces, and/or the controller may determine if some threshold condition is met. For example, the controller may set an initial condition that ego vehicles will only execute the instructions (e.g., carry out the task) if the occupied bounded regions in the yard exceed a threshold number or percentage of bounded regions in the yard. Some initial conditions may apply to specific commands. For example, the move command may be executed only if the ego vehicle is idle. In other examples, the move command may lack said condition, have other conditions, or have no conditions. The controller may query the localization modules, range finder systems, and so forth, to determine the current location and pose of the ego vehicle (as well as other ego vehicle state data), and so forth. The process 900 may then continue to act 906.

At act 906, the controller determines one or more paths from the current location of the ego vehicle to one or more destinations. For example, if the task is to move an asset from point A to point B, the ego vehicle may determine one or more paths from the current location of the ego vehicle to point A, and then from point A to point B. The controller may determine the paths based on many criteria. For example, the controller may query the asset state data associated with the asset. The ego vehicle may determine, as one example, that the asset has a given wheelbase, and eliminate any possible paths that do not accommodate the turning radius of the asset based on the wheelbase. Likewise, if the asset is known to contain fragile items, the controller may determine that a smoother or gentler path (for example, a path with fewer potholes) is preferable, and eliminate paths that contain too many potholes (or other obstructions, such as speed bumps). If the asset is known to be damaged, the controller may signal that a human driver may be required to move the asset. The controller may query the database to determine the type of glad hands present, and may signal that a human driver may be needed to move the asset if the glad hands are of a type that an automated glad hand coupling system is unable to autonomously couple to and uncouple from. The controller may query the database to determine the height of the asset to be moved (and may query the height of the trailer body, the kingpin height, the landing gear height, etc.). The controller may signal that a human is required raise the height of an asset if one or more of the queried heights are not sufficiently high to allow the ego vehicle to couple to the asset. The controller may also consider things like the recency of data on the virtual map or the system's certainty in data on the virtual map. For example, the controller may determine that some possible paths contain old or out-of-data information (e.g., that the paths correspond to parking spots, locations, or assets that were last observed by the ego vehicle a long time ago), and may generate paths that would route the ego vehicle to allow the ego vehicle to update out-of-date information. The controller may also determine where along an aisle the ego vehicle is to travel. For example, a given aisle may have parking spaces on either side. The controller may control the ego vehicle to travel closer to one side of the aisle or another. In some examples, the controller may determine where in the aisle, relative to the sides, the ego vehicle should travel based on whether the ego vehicle is too close to and/or too far from one side or the other of the aisle to take useable pictures. The process 900 may then continue to act 908.

At act 908, the controller selects one or more paths to evaluate from among all the paths generated. The process 900 may then continue to act 910.

At act 910, the controller determines whether the selected path (or paths) are paths of best-fit. Best-fit does not necessarily mean the shortest or most efficient path, but may be a path that allows the ego vehicle to carry out the tasks while also accomplishing other objectives or taking into account other considerations. For example, the controller may assign a weight to the length of the path, the fuel efficiency of the path, the recency of information about assets along the path, or any other aspect of the path, and may use the weights of the combined aspects to determine an overall utility value for the path (or for each potential path). The controller may select the path with the highest overall utility value as the path to use. If the controller determines that the path is the best-fit path (910 YES), the process 900 may continue to act 912. If the controller determines that the path is not the best-fit path (910 NO), the process may return to act 908.

At act 912, the controller controls the ego vehicle to route along the chosen best-fit path. As the ego vehicle travels, the ego vehicle may perform various functions including identifying assets along the path (using the asset identifiers discussed herein), associating those assets with locations, and/or updating the virtual map. The process 900 may then continue to act 914.

At act 914, the controller determines if the best-fit path should be altered. For example, the ego vehicle may detect an obstruction along the path, or an asset believed to be located at a certain location may not be present. Possible obstacles include a truck blocking an aisle, or a do not enter sign, or a barrier. Likewise, the asset not being located at a certain location may include the target asset not being at point A, thus calling for remedial action of some sort. In some examples, the controller may determine that old or out-of-data asset state data should be updated, and reroute the ego vehicle to pass by assets that have not been seen (that is, not been updated) such that the timer period between the last update and the present time exceeds a predetermined threshold time for maintaining freshness of data. The predetermined threshold time may be 15 minutes, 30 minutes, or any other amount of time and may be set by a system operator and/or end user. In some examples, an update time difference (which may correspond to the predetermined threshold) may be compared to a time a database entry was last updated to determine whether the database entry is stale. A stale database entry may then be updated when the ego vehicle next passes by the region where the asset corresponding to the stale database entry is located. In some examples, the controller may determine that the ego vehicle should be repositioned within a given aisle as well. For example, if the assets along the route are too far or too close to the ego vehicle for the cameras on the ego vehicle to acquire useable images of the assets, the controller may determine that the ego vehicle should move closer to and/or further from one side or the other of the aisle. If the controller determines that the best-fit path should be altered (914 YES), the process 900 continues to act 916. If the controller determines that the best-fit path should not be altered (914 NO), the process continues to act 918.

At act 916, the controller determines various new paths from the current location of the ego vehicle (given the current ego vehicle state) to one or more new destinations. For example, if the asset is not present at point A, the controller may determine one or more search paths that would allow the ego vehicle to search the yard for the asset, and—once found—allow the ego vehicle to move the asset from wherever it is to point B.

In some examples, if an asset is not where it is supposed to be (e.g., the asset is not located at the location associated with the asset identifier of the asset), the controller may create one or more search paths to find the asset. Search paths may be constructed such that the ego vehicle will move through the yard checking asset identifiers until the controller identifies the asset identifier of the missing asset. Search paths may be constructed according to various algorithms. For example, a simple search may begin at point A (where the asset was supposed to be), and then move away from point A, up and down aisles, until the asset is found. Other search algorithms may be more sophisticated, and may involve determining likely locations of the asset or partitioning the search area for more efficient searching, or querying other ego vehicles to search for the asset and/or to determine whether those ego vehicles had seen the asset identifier of the misplaced and/or missing asset. When searching, the controller may execute process 900 of FIG. 9 recursively or as a subroutine. That is, when searching, the controller may perform the search as an instance of process 900 of FIG. 9 because process 900 is equally applicable to searching as it is to other pathfinding functions. Thus, the best-fit path may be the best-fit path for searching for a missing asset. Once the missing asset is located, the controller can control the ego vehicle to return to its previous instruction that was interrupted by the search.

In some examples, the controller may give additional weight to paths that would route the ego vehicle by older or stale data (e.g., data that is older than the predetermined threshold time or that is near the predetermined threshold time) when searching the yard for missing assets. In general, areas with low confidence data are more likely to contain a missing asset than areas with high confidence data, and thus it may be more efficient to search low confidence areas first. The controller may determine potential new paths using the same or different characteristics and weights compared to act 906.

Once one or more new paths are determined, the process 900 may then continue to act 910 (to select a path of best-fit from among the one or more new paths).

At act 918, the controller has determined that no further path adjustments are warranted, and the ego vehicle may proceed to its next destinations (e.g., point A from the starting position of the ego vehicle, or point B from point A, and so forth).

Figure 10:
FIG. 10 illustrates a user interface according to an example.

FIG. 10 illustrates an example of a user interface 1000 for controlling the ego vehicle and viewing the asset identifier and related information. The user interface 1000 may be implemented on any computational device (such as a tablet, computer, phone, laptop, and so forth). The user interface 1000 may also be modular and/or removeable and/or remotely connected to the ego vehicle.

The user interface 1000 includes a control interface 1002, an information display 1004 that may include an asset ID display 1004a, an asset location and/or destination display 1004b ("asset location display 1004b"), an exceptions display 1004c, and a map and/or camera display 1006 ("map display 1006"). The virtual map display 1006 may display a map 1008 of the yard, and may show an icon indicating an asset 1010 ("asset indicator 1010"), which may correspond to a location of an asset, as well as indicators of the ego vehicle 1012 and ego vehicle heading 1014 ("heading 1014").

The control interface 1002 may allow a user to input the identifiers of assets, locations or destinations of assets, routing commands, and so forth for the ego vehicle. The control interface 1002 may allow a user to adjust any rules or criteria the ego vehicle is operating under, and may allow the user to manually control the ego vehicle. The control interface 1002 may display any information and/or allow modification of any settings that control the ego vehicle. The control interface 1002 also may prompt a user for input when the ego vehicle cannot determine on its own what to do (such as might arise due to an exception or error related to route planning or race conditions, and so forth).

The information display 1004 may display information about the ego vehicle and/or the asset, as well as information about errors, exceptions, certainty in determinations of identifiers and/or locations, and any other information collected or used herein. In particular, the information display 1004 may display the asset identifier the ego vehicle has associated with a given asset using the asset identifier display 1004a, the location of the asset and/or destination in the yard (by geospatial coordinates, parking space identifier, or any other method) using the asset location display 1004b, and any errors, mistakes, or other information using the exceptions display 1004c. However, as stated, the information display 1004 is not limited to merely asset identifiers, locations and/or destinations, and/or errors, but may display any information collected or used herein. For example, the information display 1004 may display information about the current task of the ego vehicle, as well as past and/or upcoming tasks (for example, a task queue) and any information associated with those tasks.

The map display 1006 may display any information the information display 1004 can display. The map display 1006 also may display one or more maps of the yard, such as the map 1008 of FIG. 10. The map 1008 may be a simple map intended for users, that displays less and/or minimal information needed to carry out the task the ego vehicle is tasked with, or the map 1008 may be an engineering map that displays a full assortment of technical details. The map display 1006 also may display a feed (which may be live or recorded) of the camera inputs on the ego vehicle and/or the range finder inputs on the ego vehicle.

The map 1008 may include a representation of the ego vehicle 1012 showing the location of the ego vehicle 1012, as well as a representation of the heading 1014 of the ego vehicle 1012, such that a user can see where the ego vehicle 1012 associated with the control interface 1000 is located and where the ego vehicle 1012 is heading. The map 1008 also may include a representation of where the ego vehicle 1012 is going, such as the asset indicator 1010. The map 1008 may also contain indicators of other vehicles and objects in the yard. For example, the map 1008 may contain indications of one or more objects 1016 (including obstructions and other types of objects) and/or other vehicle 1018 (which may include other ego vehicles, as well as their headings and any other information related to the other vehicles).

The asset indicator 1010 may display more information than just the location of the asset. For example, part of the asset indicator 1010 may be shaded, colored, or otherwise configured such that the asset indicator 1010 depicts, at a glance, whether the asset corresponding to the asset indicator 1010 is high enough off the ground to be hitched to the ego vehicle 1012 and/or hitched to another tractor, or whether the asset contains fragile materials, the wheelbase of the asset, and any other data related to the asset state data. In one example, an asset that is sufficiently high off the ground for the ego vehicle 1012 to hitch to the asset will have an asset indicator 1010 that is colored a particular way (e.g., green). Hitching here may refer to both autonomous hitching (e.g., where the ego vehicle carries out the hitching itself), or manual and/or assisted hitching (e.g., where a human or other entity assists to hitch the asset to the ego vehicle or another vehicle). The asset indicator 1010 (and indeed, other parts of the virtual map) may be adjusted dynamically depending on the type of task the ego vehicle 1012 is carrying out. Thus, if hitching is not relevant, the asset indicator 1010 may still be colored a particular way (e.g., green), but indicating something else relevant to the particular task. Alternatively, the icons may simply be colored different colors to indicate different things regardless of task.

The map 1008 and/or map display 1006 may also be functional. For example, if it is desired to create a task to move an asset and/or the ego vehicle from one location to another, the user may select the asset and the destination as well as the nature of the task and any acts and/or steps to be performed by the ego vehicle as it moves itself and/or the asset. In some examples, the interface may be drag and drop (that is, select a representation of an asset and "drag" the representation of the asset to a representation of the desired location of the asset).

The interface elements need not be as shown in FIG. 10. For example, the heading information corresponding to the heading 1014 may be displayed numerically or as an arrow or line or other appropriate visual expression of the heading 1014. The asset indicator 1010 may be a highlighted parking space, a symbol or character to mark a target destination, an entire visual representation of the path to the destination, or any other appropriate visual representation of the destination and/or path the ego vehicle will take.

Furthermore, while the interface 1000 is laid out in a particular manner, there is no need for the interface 1000 to be exactly as shown. The interfaces and displays shown may be moved around, merged together, selectively appear based on user inputs, and so forth. The interface 1000 is capable of showing all the relevant information. The user interface 1000 may be connected to a wireless transceiver and may be capable of receiving and providing updates such that the information displayed by and the software powering the interface 1000 is always up to date or may be updated.

With respect to the foregoing, the various processes, methods, and techniques described herein may be applied to one or multiple ego vehicles. Thus, for example, if an ego vehicle is collecting updated information concerning an asset in a bounded region, that ego vehicle may be different that the ego vehicle which originally approached the bounded region. Thus, for example, an idle ego vehicle (e.g., an ego vehicle not currently in use or which is not moving and/or is presently stopped) may be chosen for a given task if other ego vehicles are busy.

Various controllers, such as the controller 308, may execute various operations discussed above. Using data stored in associated memory and/or storage, the controller 308 also executes one or more instructions stored on one or more non-transitory computer-readable media, which the controller 308 may include and/or be coupled to, that may result in manipulated data. In some examples, the controller 308 may include one or more processors or other types of controllers. In one example, the controller 308 is or includes at least one processor. In another example, the controller 308 performs at least a portion of the operations discussed above using an application-specific integrated circuit tailored to perform particular operations in addition to, or in lieu of, a general-purpose processor. As illustrated by these examples, examples in accordance with the present disclosure may perform the operations described herein using many specific combinations of hardware and software and the disclosure is not limited to any particular combination of hardware and software components. Examples of the disclosure may include a computer-program product configured to execute methods, processes, and/or operations discussed above. The computer-program product may be, or include, one or more controllers and/or processors configured to execute instructions to perform methods, processes, and/or operations discussed above.

As described herein, many aspects of the systems and methods are carried out onboard the ego vehicle (e.g., the onboard system 709 of FIG. 7). However, other architectures are also possible. Processing of location data and/or range finding data, asset ID functions, rectification, association, and so forth, may all be performed on cloud services, by external servers, or otherwise performed offboard the ego vehicle.

Having thus described several aspects of at least one embodiment, it is to be appreciated various alterations, modifications, and improvements will readily occur to those skilled in the art. Such alterations, modifications, and improvements are intended to be part of, and within the spirit and scope of, this disclosure. Accordingly, the foregoing description and drawings are by way of example only.

What is claimed is:

1. A method of maintaining trailer asset data in a database of a yard, the method comprising:
comparing an update time difference for one or more database entries to a predetermined data refresh threshold, wherein the update time difference for a database entry is a difference between a current time and a time the database entry was last updated;

commanding an ego vehicle to move a first asset within the yard from a first location to a second location;
wherein when the update time difference for a first database entry exceeds the predetermined data refresh threshold, and a first associated location associated with the first database entry is outside of a shortest path between the first location and the second location, causing the ego vehicle to move the first asset from the first location to the second location via a route that passes by the first associated location; and
updating the first database entry with newer data obtained from at least one sensor located on the ego vehicle when the ego vehicle passes by the first associated location.

2. The method of claim 1 wherein the at least one sensor includes a video camera.

3. The method of claim 1 wherein
each time an ego vehicle passes by an asset location where an asset may be located, the at least one sensor scans a bounded region at the asset location,
a controller in communication with the at least one sensor determines, based on data provided by the at least one sensor, whether the asset is located within the bounded region,
if the asset is determined to be at least partially within the bounded region, the controller determines an identity of the asset relative to the bounded region and compares the identity to a stored identity for a database entry associated with the bounded region.

4. The method of claim 3, wherein if the identity matches the stored identity, the data stored in the database associated with the bounded region is not altered, and a time of a last data update for this database entry is reset to the current time.

5. The method of claim 3, wherein if the identity does not match the stored identity, the identity is recorded in the database entry associated with the bounded region, and a time of a last data update for the database entry associated with the bounded region is reset to the current time.

6. The method of claim 3, wherein a first image is provided to an asset ID module if the asset located within an unprocessed version the first image occupies at least 50% of the image.

7. The method of claim 6, wherein the identity of the asset is determined by
locating an asset identifier within the first image of the asset captured by the ego vehicle,
extracting the asset identifier from the first image by the asset ID module, and
providing the asset identifier to a rectification module to determine if the asset identifier matches a known asset identifier.

8. The method of claim 7, wherein the rectification module determines a probability that the asset identifier is erroneous.

9. The method of claim 8, wherein if the probability that the asset identifier is erroneous is above a predetermined threshold probability, an ego vehicle is routed to pass by the location of the bounded region to scan any asset present within the bounded region.

10. The method of claim 8, wherein if the probability that the asset identifier is erroneous is above a predetermined threshold probability, a second image of the asset is obtained, a second asset identifier is located within the second image of the asset, and
the asset identifier is extracted from the second image by the asset ID module.

11. The method of claim 10, wherein the asset identifier extracted from the second image is provided to the rectification module to determine if the asset identifier matches a known asset identifier.

12. The method of claim 7, wherein the rectification module uses state data associated with the asset to assist in determining the identity of the asset.

13. The method of claim 1, wherein a probability that data in a second database entry is correct is determined to be below a predetermined threshold probability, the ego vehicle is routed to pass by a second associated location associated with the second database entry to re-scan the identity.

14. The method of claim 13, wherein prior to being routed past the second associated location, the ego vehicle was idle.

15. The method of claim 1, wherein the database maintains state data associated with assets located within the yard, wherein state data comprises data describing physical features of the assets.

16. The method of claim 1, wherein the database maintains state data associated with assets located within the yard, wherein state data comprises data describing poses of the assets within the yard.

17. The method of claim 1, wherein the database maintains state data associated with assets located within the yard, wherein state data comprises data describing one or more brands of assets within the yard.

18. The method of claim 1, wherein if a subset of data in the database entry does not match the newer data obtained from the at least one sensor, a probability measure that data in the database is correct is reduced.

19. The method of claim 1, wherein a history of database entries is maintained for at least a predetermined number of passes of an ego vehicle past the first associated location, to allow current data to be compared with the history of database entries.

20. A method of maintaining trailer asset data in a database of a yard, the method comprising:

determining one or more bounded regions in a yard;

associating a first bounded region with a first database entry;

determining a time difference between a current time and a first time associated with the first database entry, wherein the first time corresponds to when data in the first database entry was entered into the database;

comparing the time difference to a predetermined time difference threshold;

wherein if the time difference is larger than the predetermined time difference threshold, routing an ego vehicle to pass by the first bounded region to scan any assets present within the first bounded region, with sensors located on the ego vehicle, to generate new scanned data;

overwriting data in the first database entry with the new scanned data; and updating the first time associated with the first database entry to a new time corresponding to when the data in the first database entry was overwritten with the new scanned data.

* * * * *